(12) United States Patent
Fox et al.

(10) Patent No.: US 9,073,590 B2
(45) Date of Patent: Jul. 7, 2015

(54) TRAILER

(71) Applicant: Honda Motor Co., Ltd., Tokyo (JP)

(72) Inventors: Andrew John Fox, Powell, OH (US);
Patrick M Shafer, Hilliard, OH (US);
Allen Benson Sheldon, Columbus, OH (US)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 31 days.

(21) Appl. No.: 14/011,974

(22) Filed: Aug. 28, 2013

(65) Prior Publication Data
US 2015/0061259 A1 Mar. 5, 2015

(51) Int. Cl.
*B62D 63/06* (2006.01)

(52) U.S. Cl.
CPC ..................... *B62D 63/061* (2013.01)

(58) Field of Classification Search
USPC ........ 280/491.1; 414/228, 385, 575, 782, 784
See application file for complete search history.

(56) References Cited

U.S. PATENT DOCUMENTS

| 4,268,209 | A  | * | 5/1981  | Westerman ............... 414/462 |
| 6,254,117 | B1 | * | 7/2001  | Cross ..................... 280/401 |
| 7,484,749 | B1 | * | 2/2009  | Doyle et al. ........... 280/460.1 |
| 7,823,901 | B2 | * | 11/2010 | Waddell ................. 280/401 |
| 2005/0104323 | A1 | * | 5/2005 | Thurm ................... 280/491.1 |
| 2007/0018429 | A1 | * | 1/2007 | Randall ................. 280/491.1 |
| 2007/0182125 | A1 | * | 8/2007 | MacDougall ......... 280/415.1 |
| 2010/0084839 | A1 | * | 4/2010 | Mayfield ............... 280/656 |

* cited by examiner

*Primary Examiner* — Tony Winner
(74) *Attorney, Agent, or Firm* — Quarles & Brady LLP

(57) ABSTRACT

A trailer is presented. First and second axles are provided, each of the first and second axles being configured to couple to at least two wheels. A chassis is connected to the first and second axles, and a hitch is connected to the chassis. A lift system engaging structure is connected to the chassis of the trailer. The lift system engaging structure is configured to releasably engage a lifting component of a lift system. The lift system is configured to raise the lifting component to position the trailer in a stowed position.

15 Claims, 26 Drawing Sheets

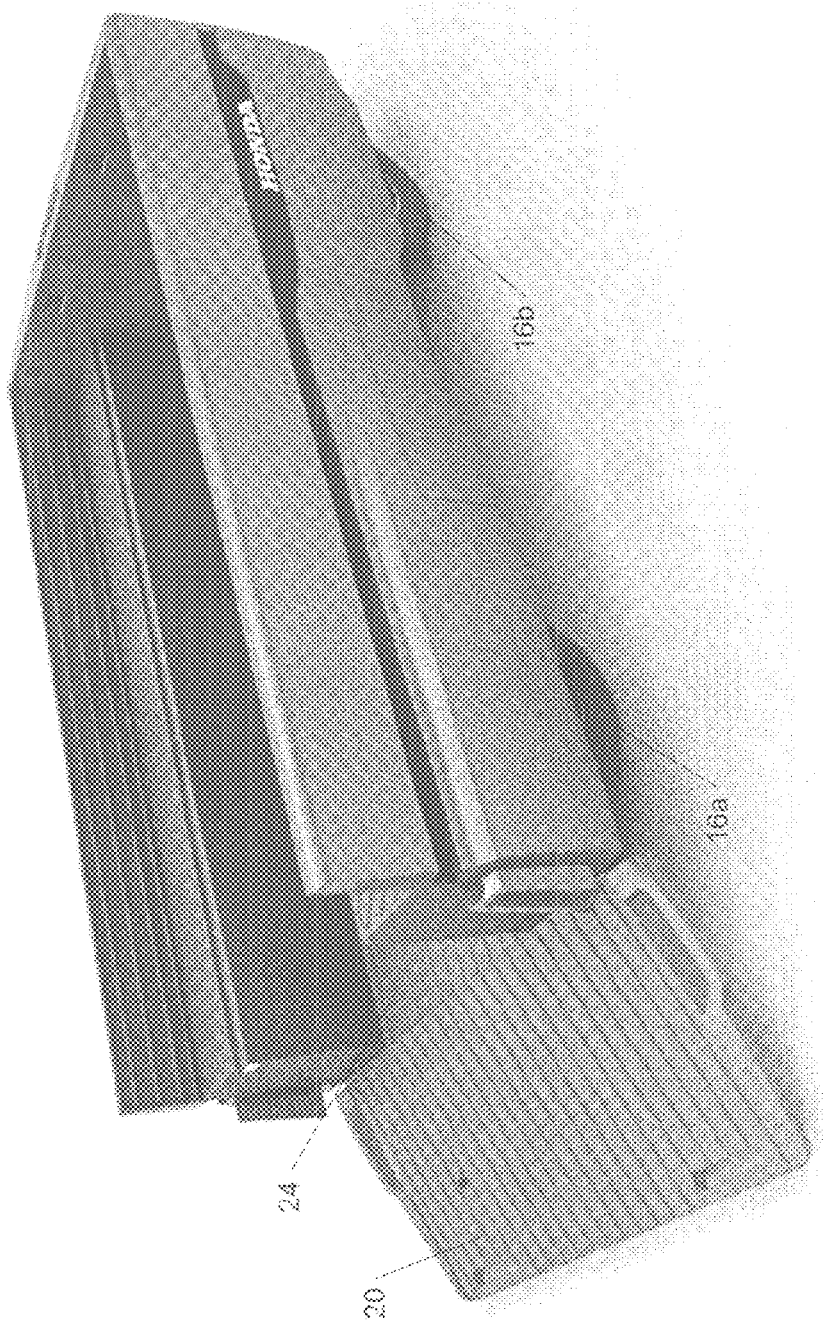

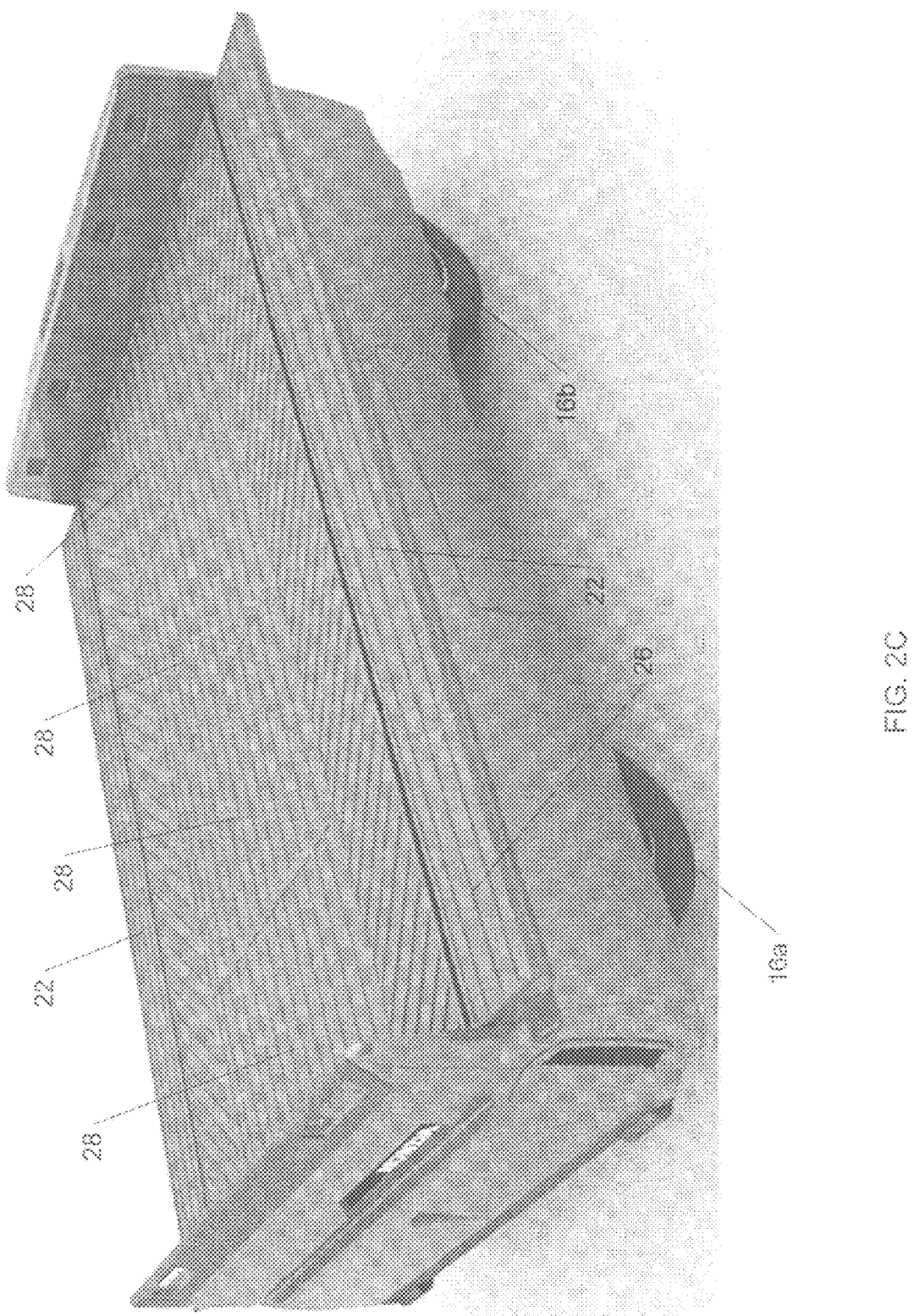

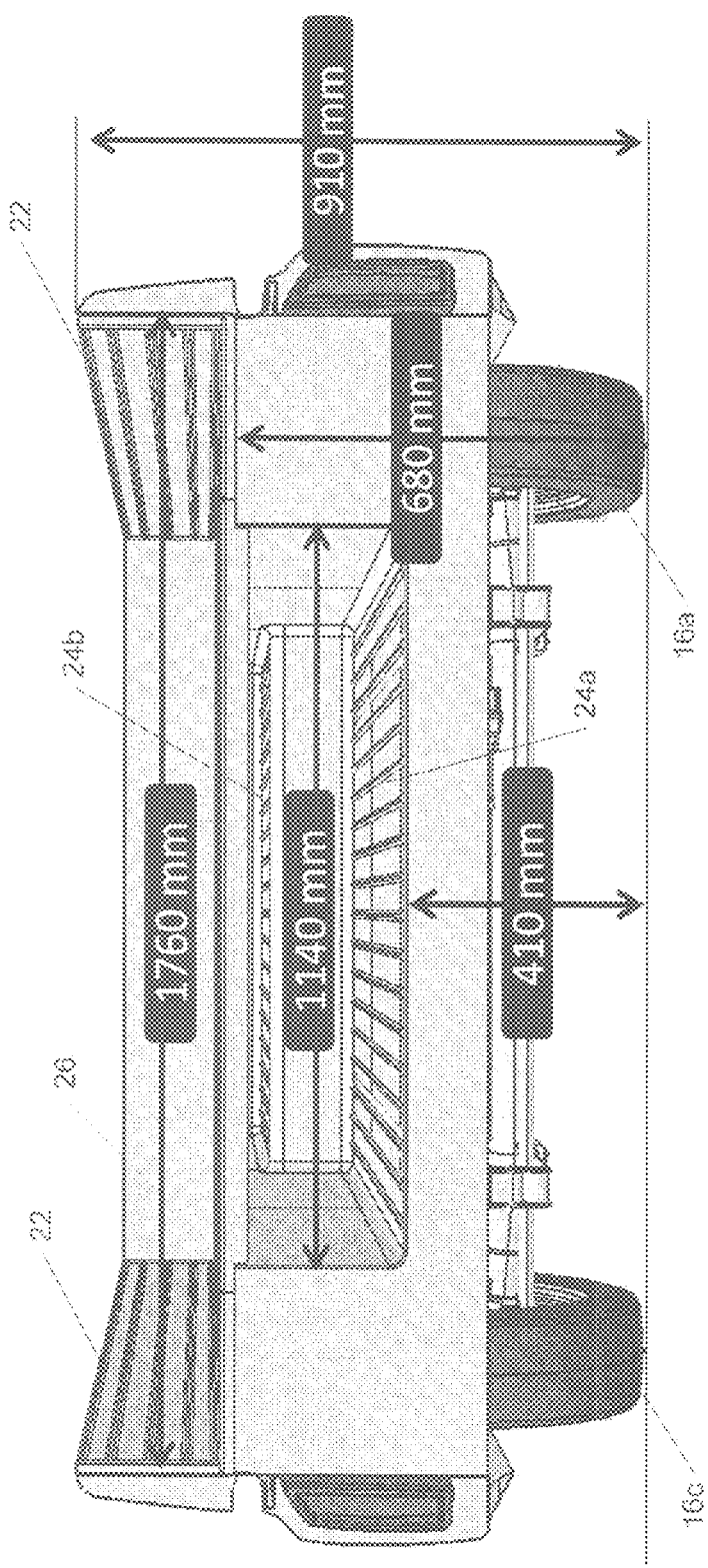

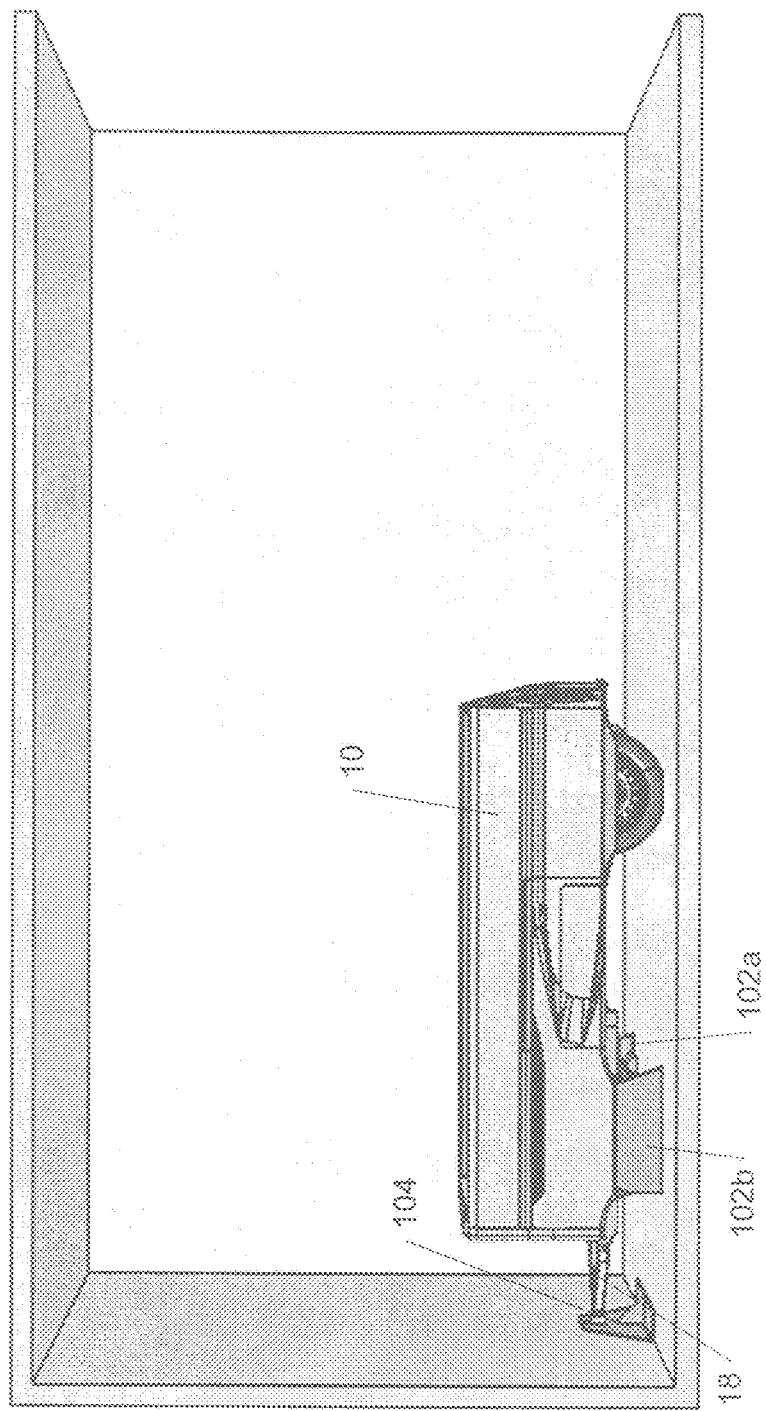

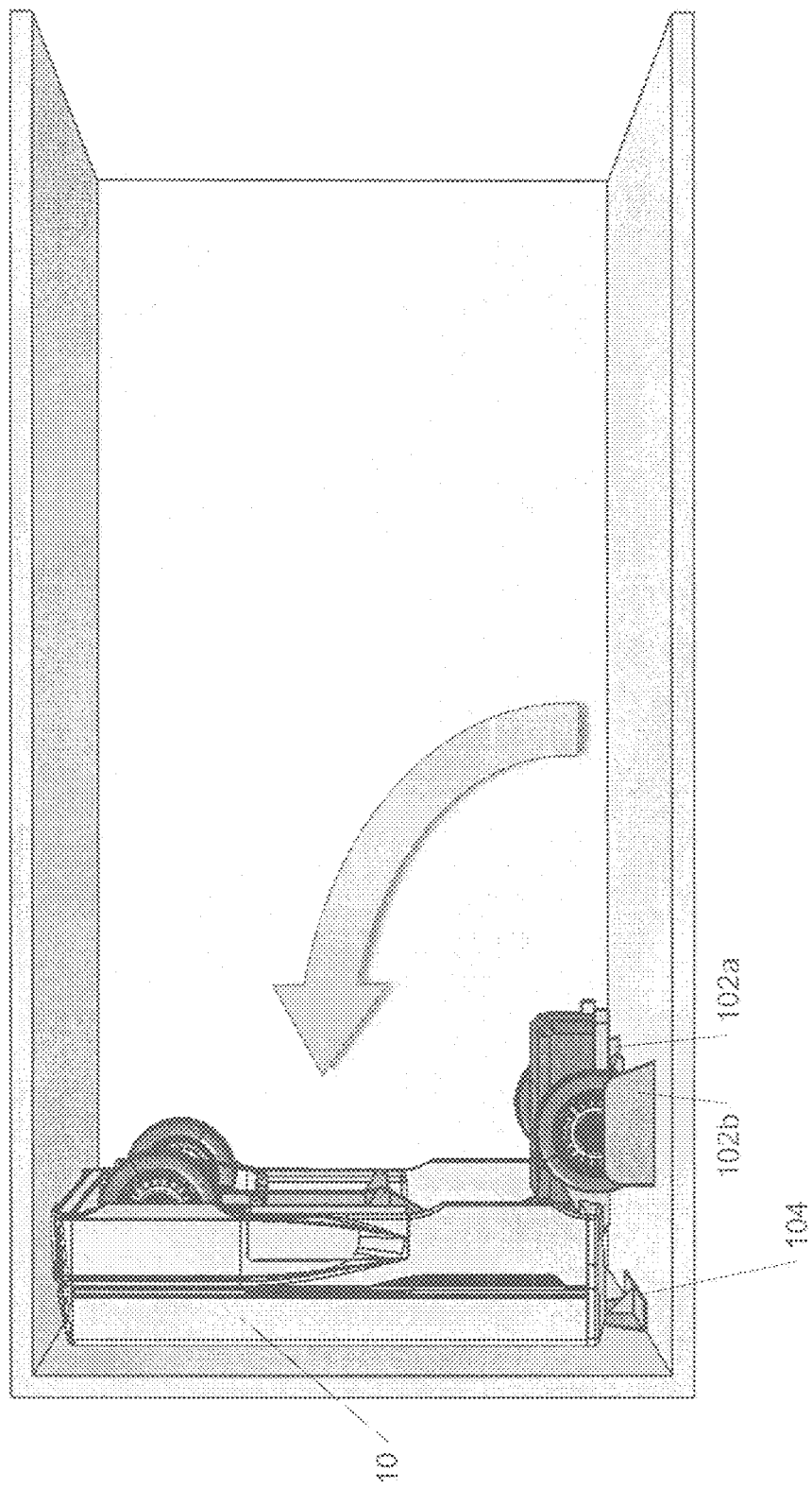

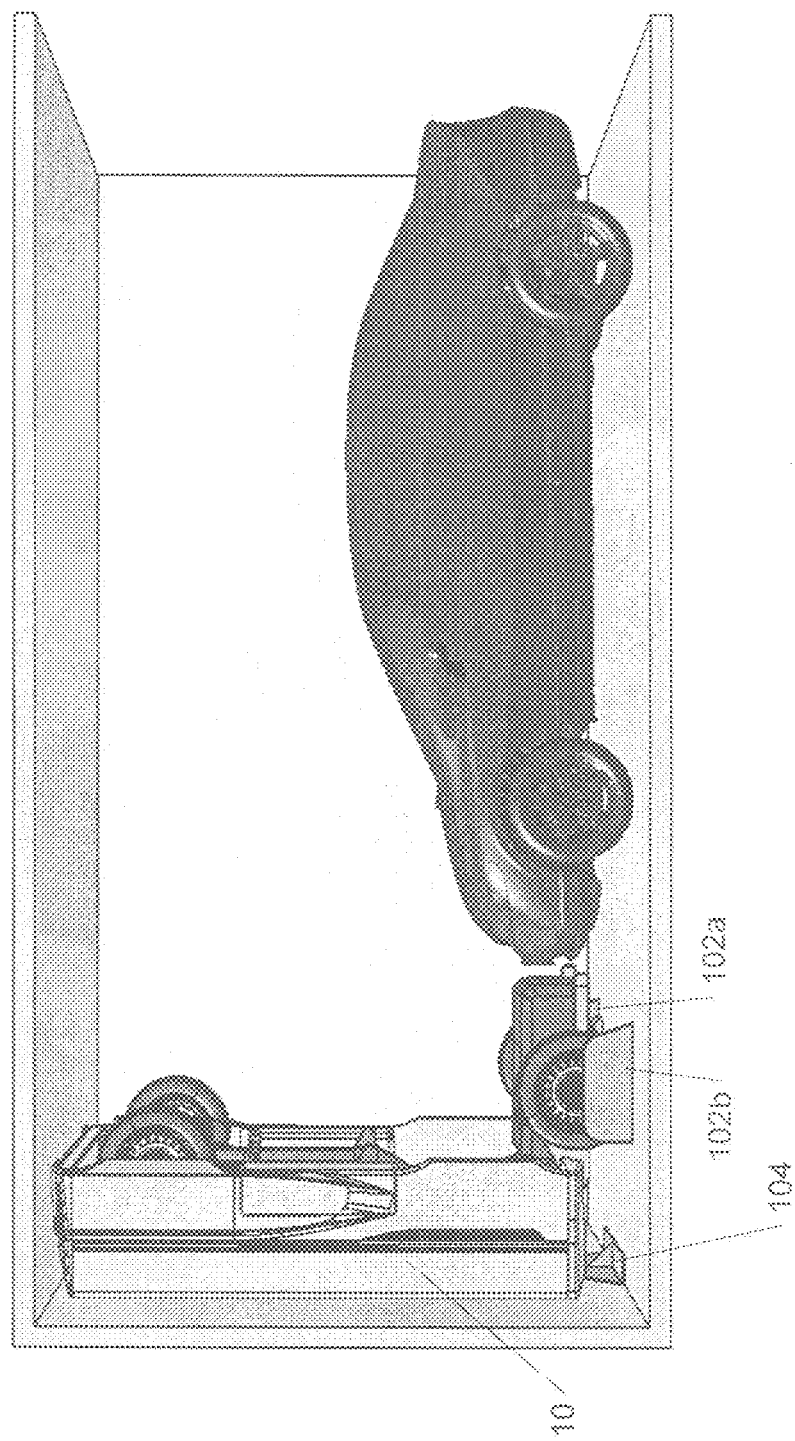

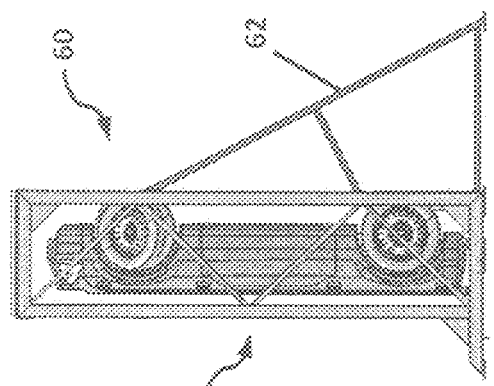
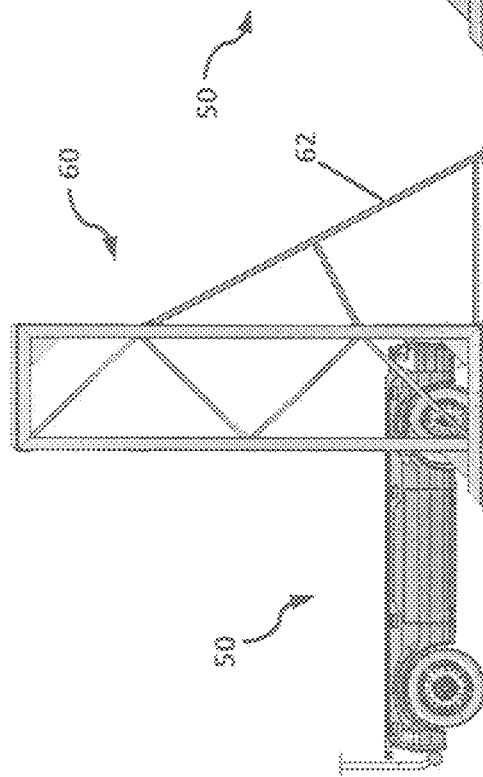
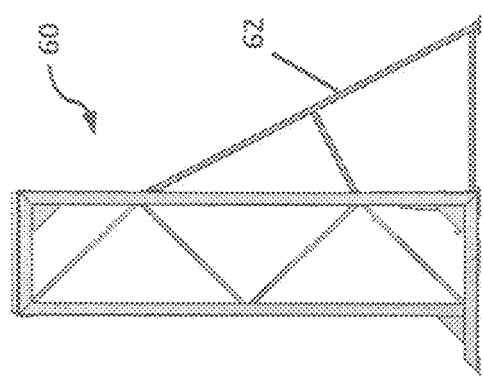

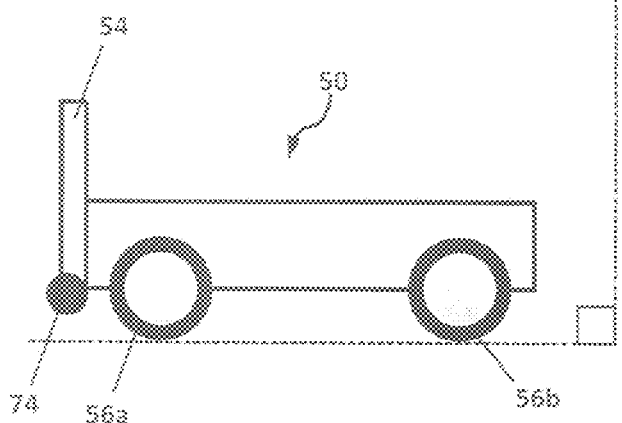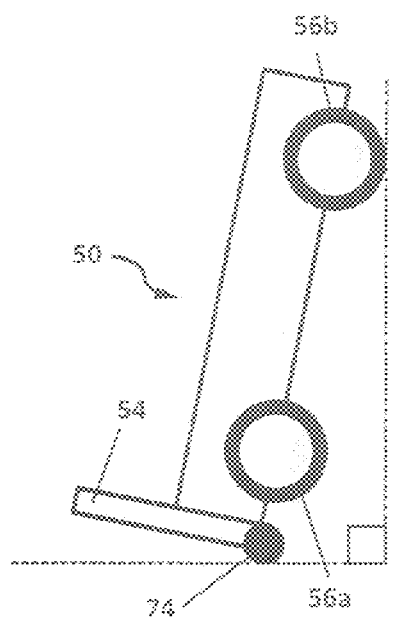
Figure 8E
Figure 8F

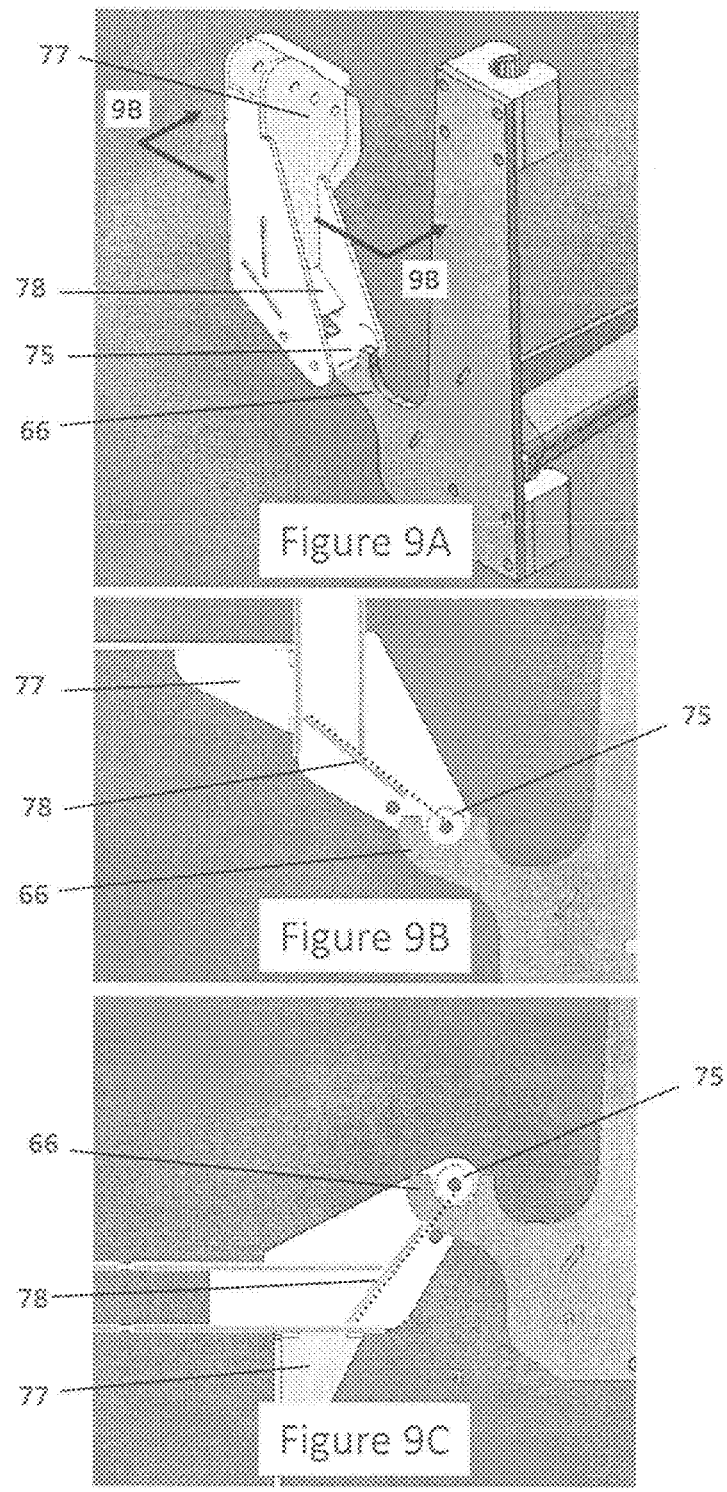

TRAILER

FIELD OF THE INVENTION

The disclosure relates in general to a system and method for a trailer and, more particularly, to a system and method for a trailer having a number of storage decks and being configured for compact storage.

BACKGROUND OF THE INVENTION

Conventional utility trailers only provide limited functionality that is specific to a particular trailer type. FIGS. 1A-1D illustrate various trailers that are each configured to provide a specific function. The trailer shown in FIG. 1A, for example, includes a fixed frame arranged to allow for rear loading. The trailer includes a rear gate that may be lowered to facilitate the placement of a load on the trailer bed. Similarly, the trailer of FIG. 1B comprises a fixed frame, but with a gate positioned along a side of the trailer to allow for side loading. Finally, the trailer in FIG. 1C has a generally planar frame, but, as shown in FIG. 1D, is configured to collapse, for easier storage.

The different functions of the trailers shown in FIGS. 1A-1D require different frame and chassis arrangements. As a result, a trailer providing one feature (e.g., front or rear loading) cannot provide other functions (e.g., collapsing for easier storage). This is particularly true of folding trailers that, in order to facilitate their compact storage, fold or collapse into a relatively compact size and shape. In order to keep the size of the folding trailers as small as possible, and to facilitate their folding or collapsing action, these trailers tend to forgo features such as rear or side-loading gates, or removable flooring that may otherwise provide additional storage capacity.

BRIEF DESCRIPTION OF THE DRAWINGS

FIGS. 2A-2E are illustrations of the present trailer system showing the trailer in a number of different load-carrying configurations.

FIG. 3 is a rear view of the trailer showing the lower deck.

FIGS. 6A-6D illustrate various steps in a process of stowing the trailer in its folded or collapsed configuration.

FIGS. 8A-8D are views of a trailer system depicting a capability of the system to store the trailer.

FIGS. 8E-8H depict exemplary storage approaches for the trailer system.

FIG. 9A is a perspective view showing a safety mechanism of the trailer.

FIG. 9B is a cross-sectional view taken along the line 9B-9B of FIG. 9A.

FIG. 9C is a view analogous to FIG. 9B in which the swivel lock mechanism is rotated approximately 90 degrees counterclockwise.

DETAILED DESCRIPTION OF THE DRAWINGS

Figure 1A:
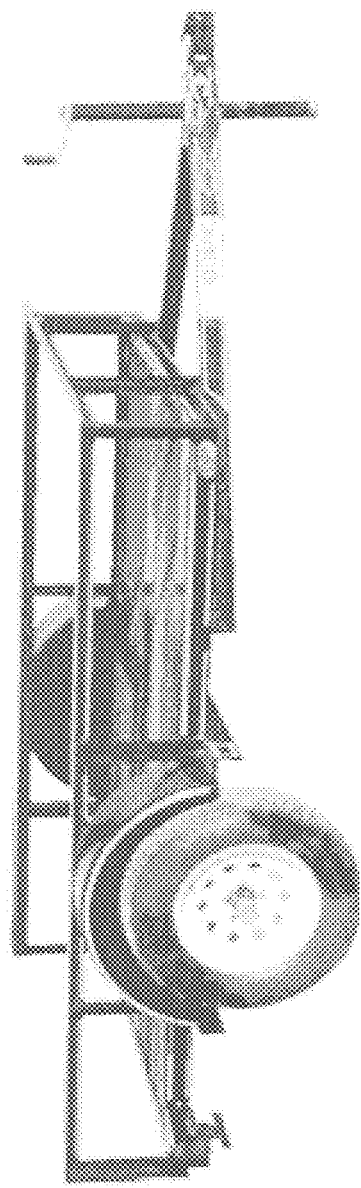
FIGS. 1A-1D illustrate various trailers that are each configured to provide a specific function.
Figure 1B:
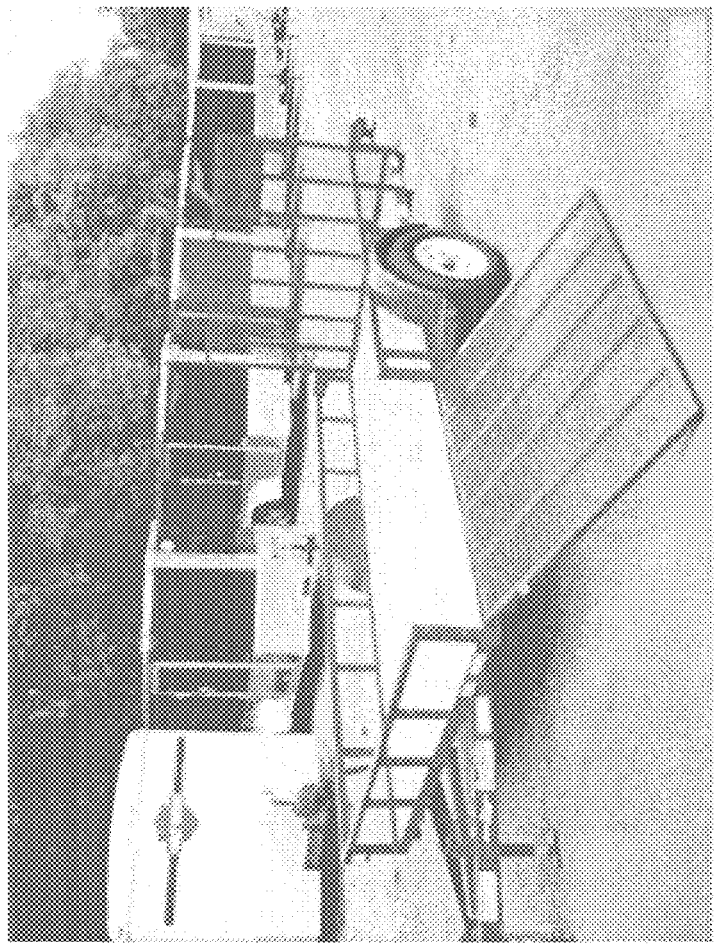
Figure 1C:
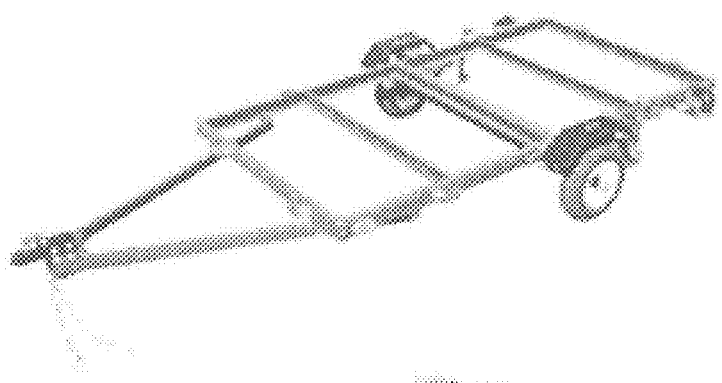
Figure 1D:

The disclosure relates in general to a system and method for a trailer and, more particularly, to a system and method for a trailer having a number of storage decks and being configured for compact storage.

The present system and method is presented in several varying embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the system. One skilled in the relevant art will recognize, however, that the system and method may both be practiced without one or more of the specific details, or with other methods, components, materials, and so forth. In other instances, well-known structures, materials, or operations are not shown or described in detail to avoid obscuring aspects of the invention.

Any schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method.

Additionally, the format and symbols employed in any such flow chart diagrams are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present trailer system provides a compact utility trailer including a number of loading platforms that can be used to transport various types of cargo. The trailer includes an upper deck. Side gates allow for easy loading of the trailer's upper deck. The trailer also includes a lower deck. A rear gate is configured to facilitate placement of a load on the lower deck.

The two-tiered deck system of the trailer allows for the placement of panels over the lower deck. By fitting these panels into place, and engaging a lock thereto, the panels, in combination with the lower deck, provide secure, lockable storage. When installed, the panels form a portion of the upper deck of the trailer. The panels may be removable from the trailer, or may be connected to the trailer at hinges allowing each one of the panels to be easily raised or lowered in a controlled fashion. Accordingly, the trailer offers a number of storage arrangements to provide flexibility to a user in how to transport a particular load.

The trailer is also configured to collapse for easy storage while occupying a relatively small space. In one implementation, the trailer collapses by lifting the bed and chassis of the trailer. The chassis is connected to the front axle of the trailer at a hinged connection so that as the bed and chassis are raised, the front wheels remain in contact with a ground surface. Additionally, when raising the bed and chassis, the tongue of the trailer, which is fixed to the front wheels is connected to a hitch mount. The combination of the front wheels and hitch mount provide adequate support to the trailer when the trailer is in its collapsed or folded position to safely and securely store the trailer.

As such, the present trailer is configured to provide a number of useful features that are only found independently in conventional trailer designs. For example, the present trailer allows for loads to be added to the trailer from either a side or rear position by lowering gates positioned at those respective locations. Additionally, the trailer includes a number of decks to facilitate the hauling of loads having different sizes, weights, and centers of gravity. Larger loads can be positioned on the upper deck, while smaller, heavier loads may be positioned on the lower deck. Additionally, because the lower deck is located down between the rear wheels of the trailer, that position facilitates the loading of heavy objects thereon.

Simultaneously, while offering the additional functionality of ease of loading, as well as several options in how to position loads on or in the trailer, the trailer is also configured to collapse so as to be stored in a relatively small area. For users that do not have large garages or warehouses in which to store bulky trailers, this feature renders the trailer easier to store and use.

FIGS. 2A-2E are illustrations of the present trailer system showing the trailer in a number of different load-carrying configurations. Trailer 10 includes bed 12 mounted over chassis 14. Four wheels 16a-16d are mounted to chassis 14. Chassis 14 includes hitch 18 allowing the trailer to be coupled to a tow vehicle for moving the trailer from one location to the next.

Bed 12 includes rear gate 20 and side gates 22 and is constructed from a tough, lightweight material. In one implementation, for example, bed 12 includes walls constructed from fiber-reinforced panels providing both strength and dent resistance. One or more of decks of bed 12 may include steel-reinforced (e.g., SRC) materials, such as those used in pickup truck beds. Bed 12 may also include a frame to provide support to the various components of bed 12. The frame includes a lightweight, strong material such as tubular aluminum or other lightweight metals or composites.

In bed 12, both rear gate 20 and side gates 22 are hinged and allow each gate to be positioned in either of an upright, locked position, or an open position. When in its open position, rear gate 20 is rotated downwards so as to contact a ground surface and provide a ramp into trailer 10, as shown in FIG. 2B. When in their respective open positions, side gates 22 are rotated downwards to a horizontal position, as shown in FIG. 2C. When side gates 22 are open, structures within bed 12 of trailer 10 prevent side gates 22 from rotating downwards beyond the horizontal position, as shown in FIG. 2C.

Figure 2A:
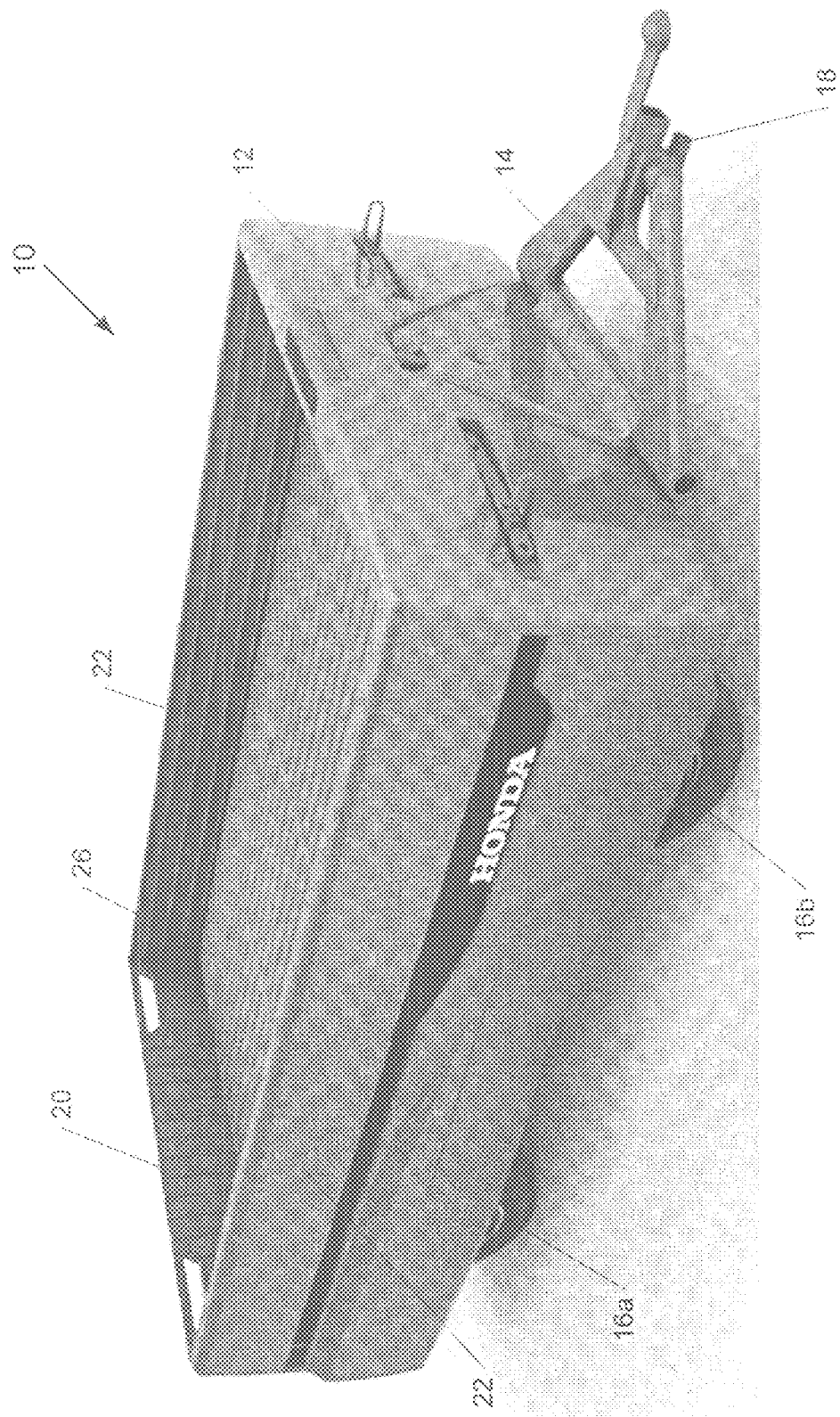
Figure 2D:
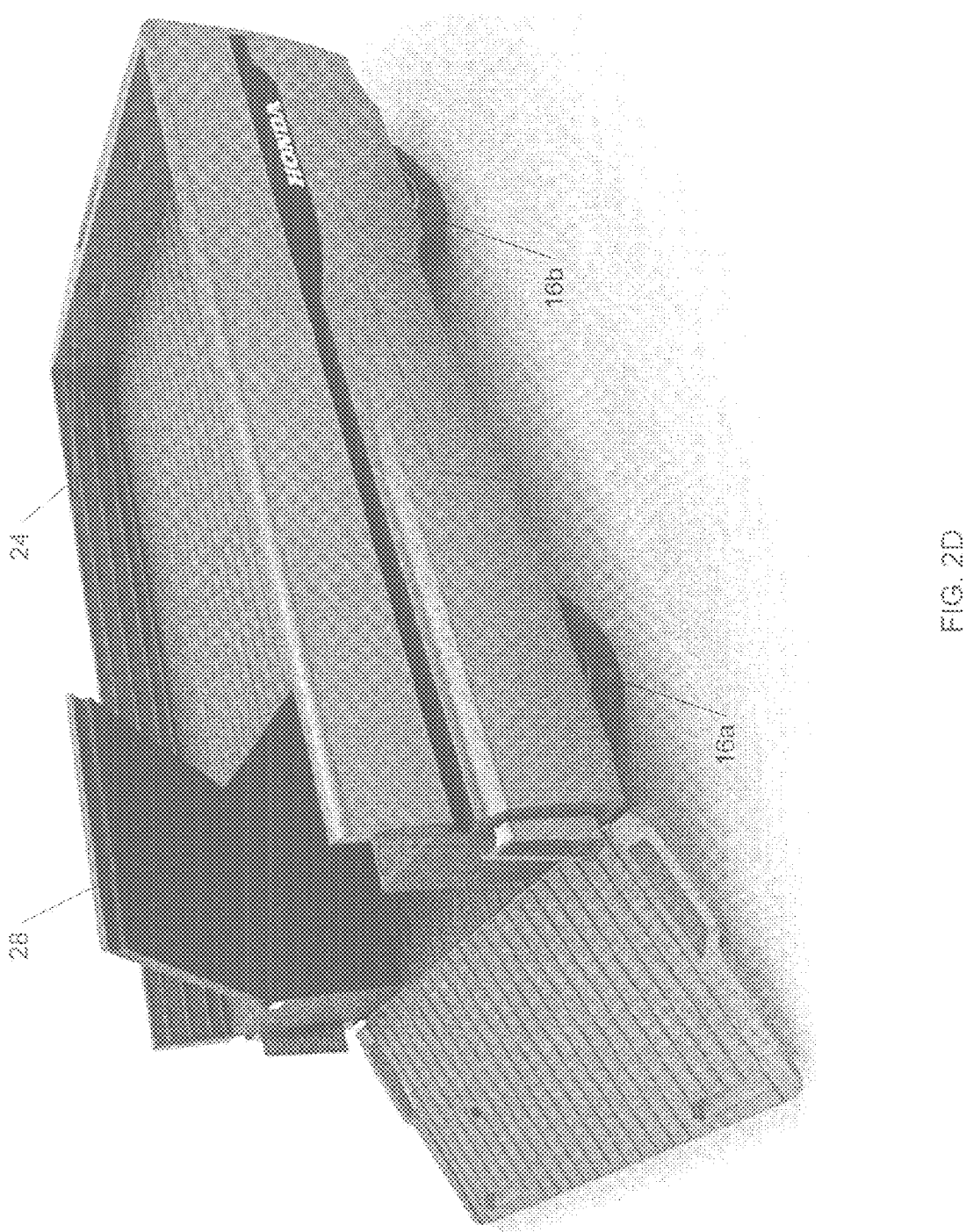
Figure 2E:
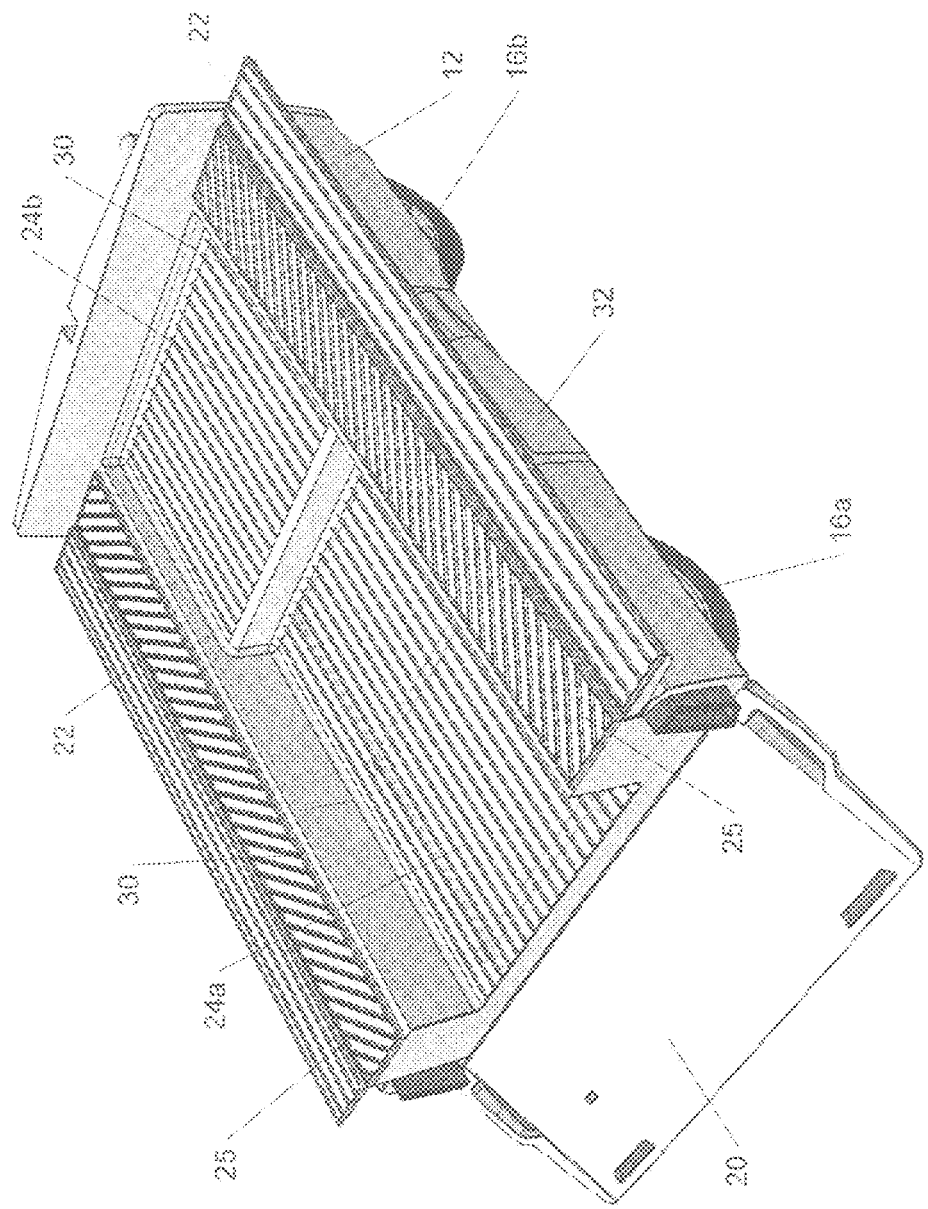

As illustrated in FIGS. 2A-2E, trailer 10 can adopt numerous positions or configurations to facilitate the transport of a number of different loads. FIG. 2E shows trailer 10 with both rear gate 20 and side gates 22 in their respective open positions. Bed 12 includes lower deck 24. In the implementation shown in FIG. 2E, lower deck 24 comprises section 24a and section 24b. Section 24b is raised over chassis 14 with respect to section 24a. Section 24b may be raised, for example, to provide room for the mounting of various mechanical or electrical components of trailer 10 to chassis 14 below bed 12 (example components are illustrated by box 34 shown in FIG. 5). In other implementations, though, lower deck 24 may be relatively flat so as to comprise a single flat or curvilinear surface. In addition to lower deck 24, in the trailer configuration shown in FIG. 2E, additional storage may be found upon side rails or fenders 25 that are positioned over wheels 16 of trailer 10.

A number of surface treatments may be applied to lower deck 24 and side rails 25 to aid in the placement and carrying of cargo. As shown in FIG. 2E, lower deck 24 includes a number of ridges running longitudinally along the deck. These ridges prevent cargo from shifting about (particularly in a lateral direction) while trailer 10 is transported. In various other implementations, the ridges may run in any suitable direction or in any pattern or combination of patterns, depending upon the desired characteristics of the surface of the trailer. Side rails 25 include a number of ridges formed at an angle of approximately 45 degrees to the centerline of trailer 10. These ridges also assist in preventing the movement of cargo when the trailer 10 itself is moved. Deck 24 and side rails 25 may also be coated with a non-slip coating to prevent the shifting of cargo during trailer 10 transportation. In other implementations, deck 24 and side rails 25 may receive surface treatments similar to those found in pickup truck beds.

As shown in FIG. 2E, this arrangement of deck 24 in combination with rear gate 20 allows for the relatively easy loading of deck 24 with cargo. This is further shown by FIG. 3. FIG. 3 is a rear view of trailer 10 with rear door 20 removed. As shown in FIG. 3, section 24a of deck 24 is positioned relatively low within bed 12 of trailer 10 between wheels 16a and 16c. This positioning of section 24a greatly facilitates the loading of section 24a with cargo, particularly when that cargo is heavy, bulky, or otherwise difficult to maneuver.

For example, when rear gate 20 is in its open position rear gate 20 can be used as a loading ramp. In such an arrangement, cargo can be pushed up rear gate 20 and positioned on section 24a of lower deck 24. Because section 24a is located relatively close to a ground surface (and at a relatively low position within trailer 10) the slope of rear gate 20 is minimized requiring the user to use less force to push objects up the ramp formed by the open rear gate 20 and into trailer 10. Additionally, the relatively low position of deck 24 within trailer 10 allows a user to more easily lift objects directly into bed 12 of trailer 10.

As shown in FIG. 2c, in addition to lower deck 24, trailer 10 may include upper deck 26. Upper deck 26 is formed by positioning a number of panels 28 within bed 12. Panels 28 are configured to be positioned upon shelf 30 defined by an interior surface of bed 12. Panels 28 can be configured to either mount to bed 12 with a hinged connection (so as to be rotatable upwards from bed 12, as shown in FIG. 2D) or to be lifted out of or removed from bed 12 completely.

With panels 28 in position, upper deck 26 is located so that an upper surface of upper deck 26 lays in the same plane as side rails 25 as well as the upper surface of side gates 22 when side gates 22 are in their open, or flat, position. This arrangement is shown in FIG. 2C. With side gates 22 open, and panels 28 in position, trailer 10 provides a large flat surface upon which to place cargo. Additionally, with side gates 22 in their open position, this surface can easily be accessed from the side of trailer 10.

As an additional configuration of trailer 10, when panels 28 are in place, panels 28, in combination with lower deck 24, form a storage volume into which cargo may be placed. This storage volume can then be used to store various items in a secure environment that is protected from the elements (e.g., rain, sun, snow, etc.). Additional security can be provided by allowing panels 28 to be locked in place, and rear gate 20 to be locked in its upright, closed position.

Upper deck 26 of trailer 10 may include any suitable surface treatments to aid in the placement and carrying of cargo. As shown in FIG. 2c, upper deck 26 includes a number of ridges running longitudinally along the deck. These ridges prevent cargo from shifting about (particularly in a lateral direction) while trailer 10 is transported. In various other implementations, the ridges may run in any suitable direction or in any pattern or combination of pattern, depending upon the desired characteristics of the surface of the trailer. Deck 26 may also be coated with a non-slip coating to prevent the shifting of cargo during trailer 10 transportation. In other implementations, deck 26 may receive surface treatments similar to those found in pickup truck beds.

Referring to FIG. 2E, trailer 10 may also include a number of side storage lockers 32 that allow for the storage of additional items within trailer 10 in a secure, lockable environment.

FIG. 3 shows an example geometrical arrangement of trailer 10. In the depicted configuration, the upper surface of section 24a of lower deck 24 is positioned approximately 410 millimeters (mm) above a ground surface. The upper surface of upper deck 26 is positioned approximately 680 mm above the ground surface. The top of side gates 22 are positioned approximately 910 mm above the ground surface when side gates 22 are in their closed positions. When in their open positions, the upper surface of side gates 22 is at approximately the same level as the upper surface of upper deck 26.

In this arrangement, the width of section 24a of lower deck 24 is approximately 1140 mm. The width of section 24a is selected to be sufficiently small so that section 24a can be sunk within bed 12 between wheels 16c and 16a.

The width of upper deck 26 is measured from the inside surface of side gates 22 when both side gates 22 are in their upright, closed position. In this implementation, the width of upper deck 26 is approximately 1760 mm.

In this configuration, the surface area of upper deck 26 is approximately 1 meter cubed ($m^3$) and the surface area of section 24a of lower deck 24 is approximately 0.5 $m^3$. The surface area of each one of side rails 25 is approximately 0.1 $m^3$.

As described above, trailer 10 can be rearranged for a number of cargo-carrying scenarios. If panels 28 are in place, with upper deck 26 fully formed, trailer 10 can carry a number of different types of cargo. For example, with side gates 22 in their open, horizontal positions (as shown in FIG. 2C), trailer 10 is arranged for carrying loads such as a pair of all-terrain vehicles (ATVs), motorcycles, golf carts, or other large-volume loads.

With panels 28 in place, upper deck 26 fully formed, and side gates 22 in their closed, upright position (as shown in FIG. 2A), trailer 10 is arranged for carrying loads such as drywall (e.g., 40 sheets comprising approximately 2,000 pounds of weight), other items in large, flat arrangements, or granular materials such as mulch, sand, gravel, dirt, etc. When trailer 10 is formed according to the geometrical sizes described above with reference to FIG. 3, trailer 10 can carry approximately 1 cubic yard of material with upper deck 26 being formed and side gates 22 in their closed, upright position.

In this arrangement, material may be loaded into the trailer over the rear gate 20 and side gates 22, if the gates are each in their closed, upright positions. Alternatively, either of gates 20 or 22 could be lowered to facilitate the placement of a load on upper deck 26.

With panels 28 removed, loads can be positioned on lower deck 24 of trailer 10. For example, trailer 10 may be loaded with an object that is sized to fit within the lowered section 24a of lower deck 24. In that case, to load the object, panels 28 are first removed. Then, rear gate 20 is lowered down into its open position, where rear gate 20 is braced against a ground surface and can operate as a loading ramp. The object can then be maneuvered into position on lower deck 24. The object may be lifted directly onto lower deck 24, or may be slid up the ramp formed by the open rear gate 20. Example objects that may be loaded into trailer 10 in this fashion include motorcycles, bicycles, appliances (e.g., fridges, and the like), and other heavy items sized to fit upon section 24a of lower deck 24.

Finally, as described above, trailer 10 may be also be used for secure and covered storage of various items. As shown in FIG. 2D, with panels 28 in place and rear gate 20 in its upright closed position, an enclosed storage volume is defined by the lower surface of panels 28 and the upper surface of lower deck 24. In that case, to load items into the enclosed storage volume, rear gate 20 can be lowered down into its open position, providing access to the sealed volume from the rear of the trailer. Alternatively, one or more of panels 28 may be raised (either by removing the panel 28 from trailer 10 completely, or lifting one of panels 28 upwards by rotating the panel about a hinge connected to bed 12 of trailer 10). Objects can then be placed into the enclosed compartment where the objects can be secured (for example, by locking panels 28 and rear gate 20 into position) to protect them from the elements (e.g., rain, sun, snow, etc.).

Example objects that may benefit from such a storage location include suitcases, camping equipment, valuables and expensive equipment, spare tires, etc.

Figure 4A:
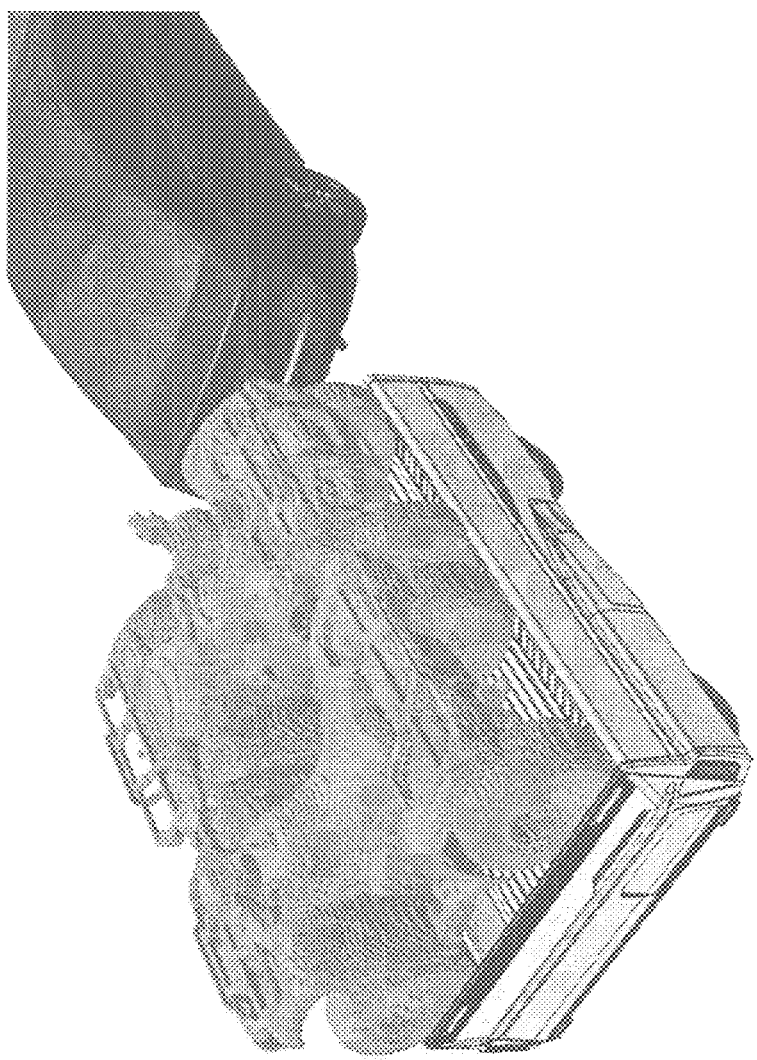
FIGS. 4A-4D illustrate example load storage arrangements using trailer 10.

FIGS. 4A-4D illustrate example load storage arrangements using trailer 10. In FIG. 4A, trailer 10 is configured with panels 28 installed to form upper deck 26. Two ATVs are positioned on upper deck 26, and side gates 22 and rear gate 20 are all in their upright, closed position. In that arrangement, side gates 22 and rear gate 20 provide support to the ATVs, preventing their moving about on the trailer while the trailer is moved. Generally, in this arrangement, objects such as ATVs are loaded onto trailer 10 by first lowering one of side gates 22.

Figure 4B:
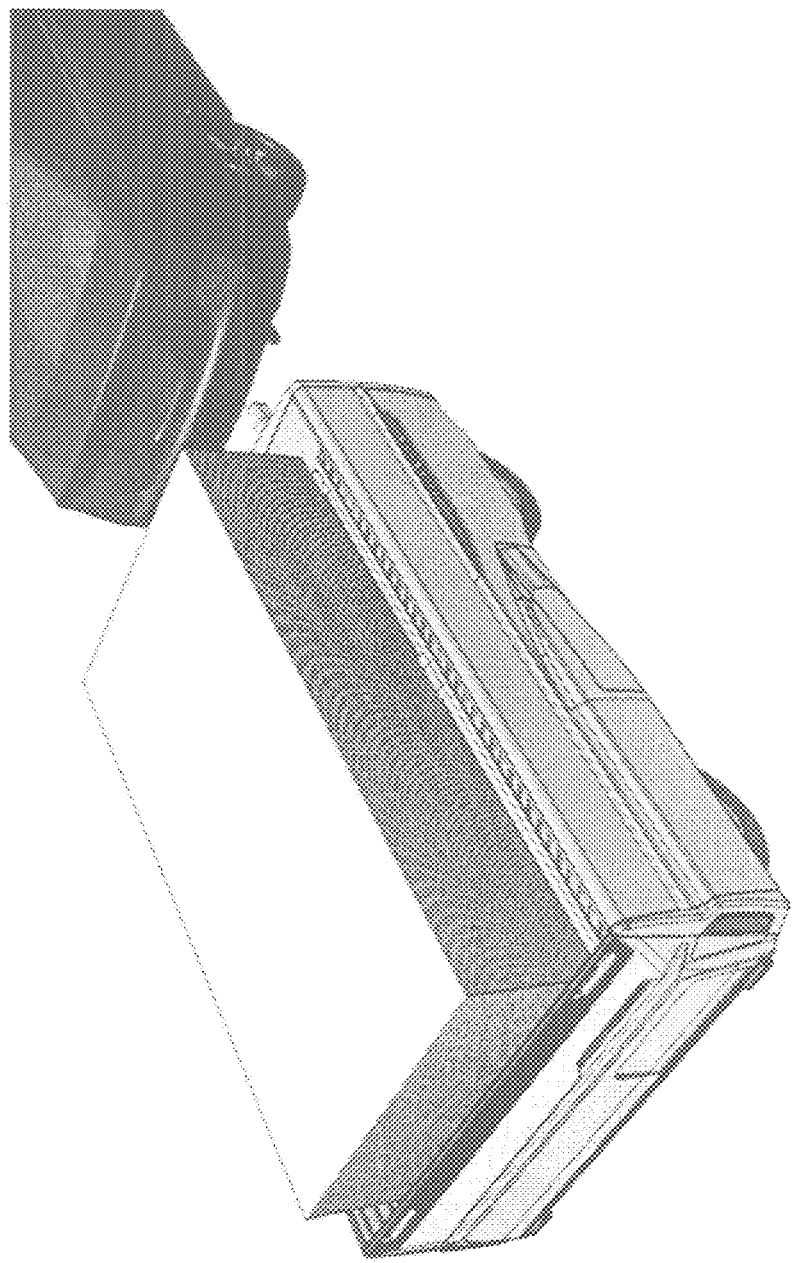

In FIG. 4B, trailer 10 is configured with panels 28 installed to form upper deck 26. A number of sheets of drywall are positioned upon upper deck 26. Again, side gates 22 and rear gate 20 are all in their upright, closed position. In that arrangement side gates 22 and rear gate 20 provide support to the drywall, preventing the drywall from moving about on the trailer while the trailer is moved. Here, the drywall can be loaded from the side (e.g., by lowering one of side gates 22). Alternatively, the drywall may simply be lifted over the side gates 22 and deposited directly upon upper deck 26.

Figure 4C:
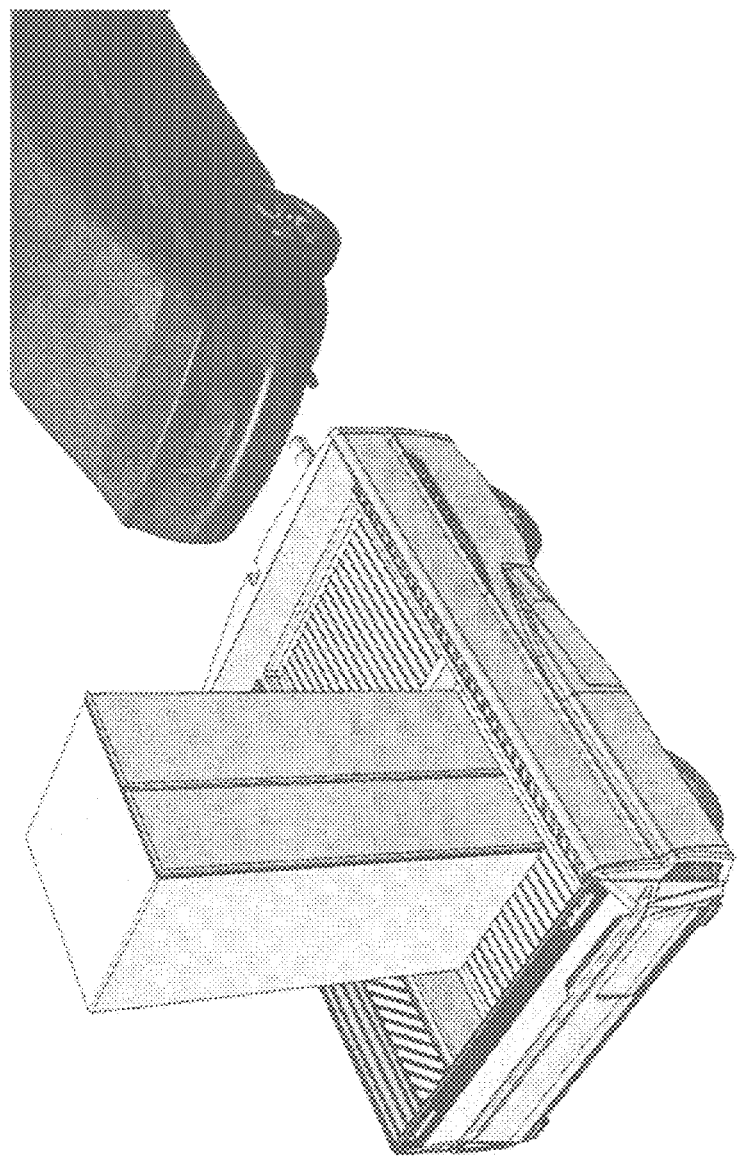

In FIG. 4C, trailer 10 is configured with panels 28 removed to expose lower deck 24. A refrigerator is positioned upon the lower section 24a of deck 24. In this case, the refrigerator may have been loaded into trailer 10 by lowering rear gate 20. After the refrigerator is loaded, rear gate 20 can be raised and locked into position to provide support to the refrigerator while the trailer is moving.

Figure 4D:
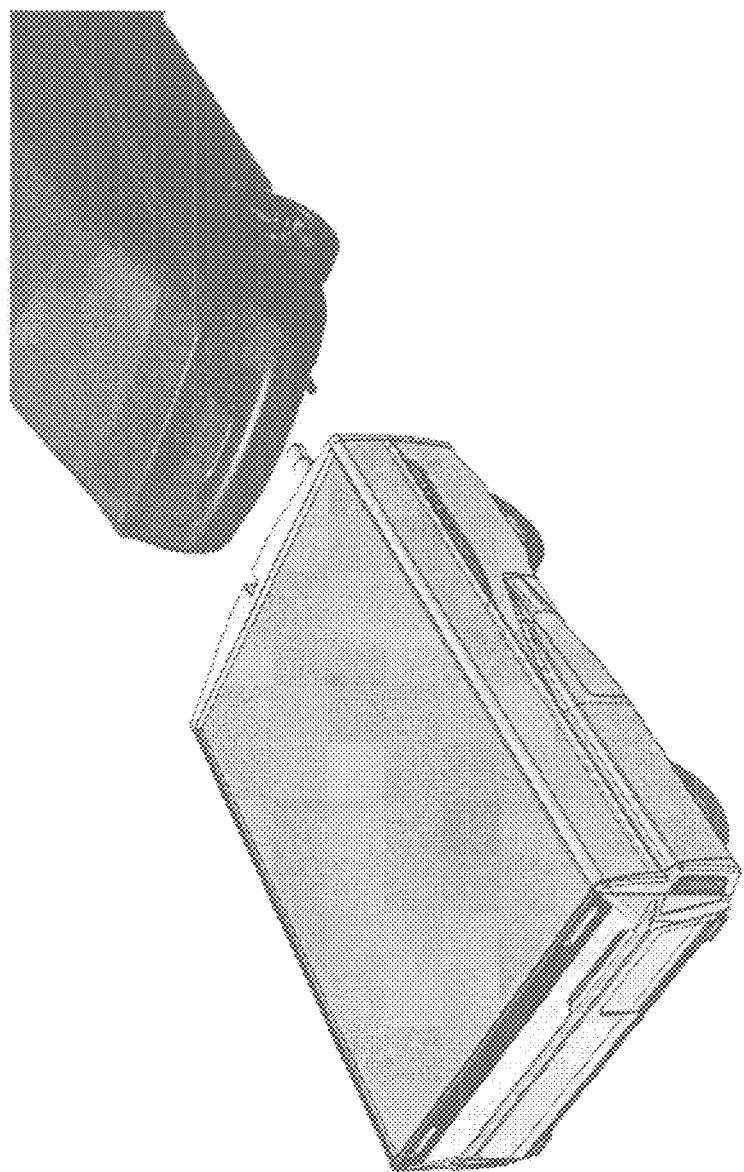

Finally, in FIG. 4D, trailer 10 is configured with panels 28 installed to form upper deck 26. Both side gates 22 and rear gate 20 are shown in their upright, locked position. In this arrangement, trailer 10 is configured to receive a load including granular materials such as mulch, sand, gravel, dirt, etc. In this implementation, the load will generally be dumped over the side of the trailer. By leaving the side gates 22 and rear gate 20 in their respective upright and locked positions, the gates assist in containing the granular load as it is dumped upon upper deck 26.

Figure 5:
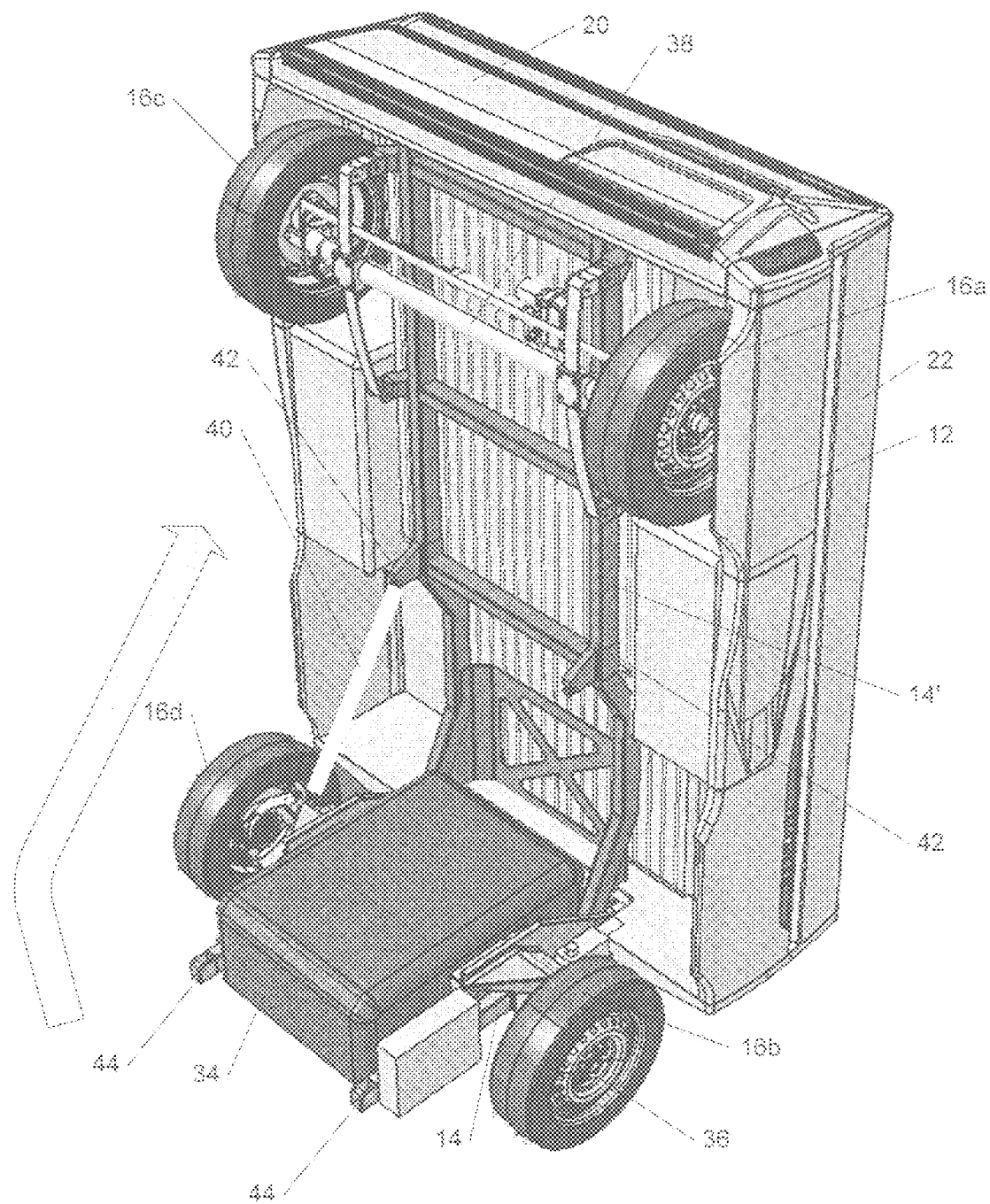
FIG. 5 is an illustration showing the trailer in its folded or collapsed state.

As discussed above, trailer 10 may also be folded or collapsed to facilitate the storing of trailer 10. FIG. 5 is an illustration showing trailer 10 in its folded or collapsed state. As shown in FIG. 5, bed 12 and a portion of chassis 14' of trailer 10 are lifted upwards, away from front axle 36 of trailer 10 to which wheels 16b and 16d are connected and into a stowed position. Rear axle 36 and connected wheels 16a and 16c stay connected to chassis 14' of trailer 10 and are lifted along with bed 12 and a portion of chassis 14'. In this arrangement, the folded trailer 10 is supported on a ground surface by wheels 16b and 16d.

The folding action of trailer 10 may be assisted by a number of lifting mechanisms 40 that are configured to support the weight of bed 12 and chassis 14' of trailer 10 when they are raised. These lifting mechanisms 40, therefore, provide a user with substantial assistance when trailer 10 is to be stowed. The lifting mechanisms 40 also provide assistance when bed 12 and chassis 14' of trailer 10 are lowered into their deployed positions.

Lifting mechanism 40 may include any combination of mechanical (e.g., spring-based), electro-mechanical (e.g., motor screw jacks), pneumatic, or hydraulic components to facilitate the lifting and lowering of bed 12 and chassis 14' of trailer 10 that are configured to provide inertial-assist to the trailer folding or collapsing process.

A latching mechanism is also provided so that when bed 12 and chassis 14' are lowered, so as to put to trailer 10 into its normal working configuration, bed 12 and chassis 14' are locked into their lowered positions allowing for safe use of trailer 10. Latching mechanisms includes tabs 42 that are configured to couple with latching mechanisms 44.

Figure 6A:
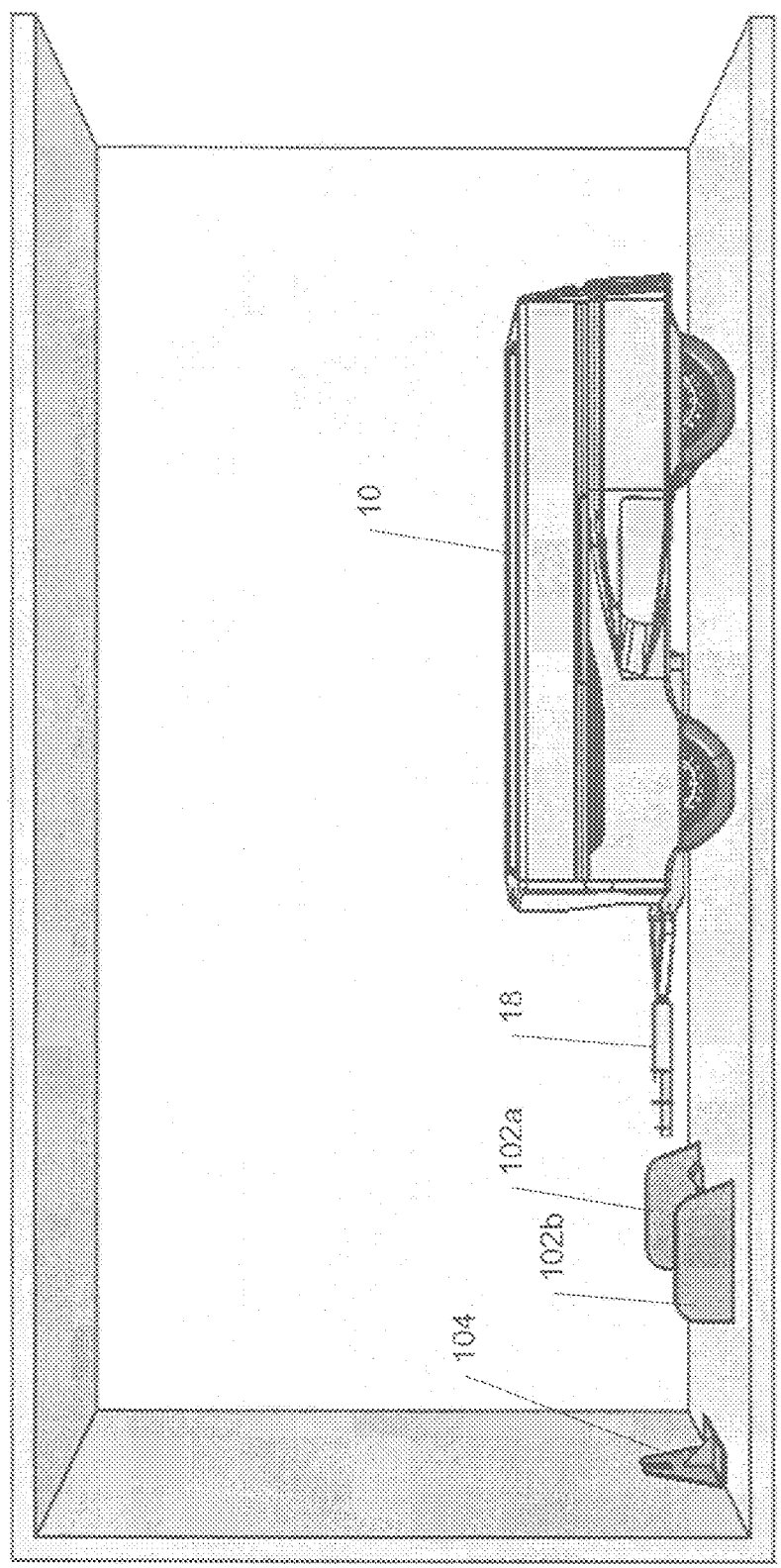

FIGS. 6A-6D illustrate various steps in a process of stowing trailer 10 in its folded or collapsed configuration. FIG. 6A shows trailer 10 positioned within a garage or other storage room or area. All cargo has been offloaded from trailer 10 and trailer 10 is ready for storing. Trailer 10 is positioned in front of wheel guides 102a and 102b and hitch mount 104. Wheel guides 102a, 102b and hitch mount 104 are configured to facilitate the storing of trailer 10. Because, when trailer 10 is folded, only the front wheels of trailer 10 contact a ground surface, trailer 10 requires an additional support structure to ensure that trailer 10 is securely and safely stowed in its upright, folded configuration. That additional support is provided by wheel guides 102a, 102b and hitch mount 104.

Wheel guides 102a and 102b comprise generally upright structures that act as guides to assist the user in correctly positioning the front wheels of trailer 10. Wheel guides 102a and 102b can be mounted to or fixed to the floor of the storage room or location in which the user anticipates storing trailer 10. Wheel guides 102a and 102b may include plastic, metal, or other materials that are sufficiently strong to prevent damage should one of the wheels of trailer 10 roll into one of wheel guides 102a and 102b. In another implementation, wheel guides 102a and 102b may be replaced by wheel chocks, depressions in the ground surface, or other structure configured to constrain a movement of the wheels of trailer 10.

Hitch mount 104 is configured to receive, and lock to, hitch 18 of trailer 10. Hitch mount 104 is fixed to at least one of the floor and a wall of the storage room or location from trailer 10. In one implementation, hitch mount 104 simply comprises a frame having a recess configured to receive hitch 18 of trailer 10. In other implementations, though, hitch mount 104 may include a locking device that, after receiving hitch 18, locks to hitch 18 to prevent removal of hitch 18. In such a case, hitch 18 may only be removed from hitch mount 104 if the user performs some task such as the pressing of a button, lifting of a lever, or the insertion and turning of a key configured to unlock hitch mount 104.

As shown in FIG. 6B, trailer 10 is then guided between wheel guides 102a and 102b and towards hitch mount 104. In many configurations of trailer 10, this will be a manual operation, with a user pushing trailer 10 between wheel guides 102a and 102b and towards hitch mount 104. However, in trailer 10's that incorporate power drive units (e.g., electric, gasoline, or other motor configurations to supply power to drive wheels of trailer 10 allowing trailer 10 to move), the user may provide input to trailer 10's drive system (e.g., via a controller, such as a joystick) in order to navigate or drive trailer 10 towards wheel guides 102a and 102b and hitch mount 104. In one implementation, trailer 10 includes a controller configured to, once trailer 10 is positioned in proximity to wheel guides 102a and 102b and hitch mount 104, autonomously navigate the trailer 10 between wheel guides 102a and 102b and to guide hitch 18 of trailer 10 into hitch mount 104.

At this point, trailer 10 is positioned so that each of wheels 16b and 16d fit within wheel guides 102a and 102b. With wheels 16b and 16d correctly positioned, trailer 10 can be rolled forward so that hitch 18 of trailer 10 enters and is fixed or otherwise coupled to hitch mount 104, as shown in FIG. 6B. At this time, if hitch mount 104 provides a locking function, hitch 18 of trailer 10 can be locked to hitch mount 104.

After hitch 18 of trailer 10 is securely fixed to hitch mount 104, and wheel guides 102a and 102b as positioned on either side of wheels 16b and 16d, bed 12 and chassis 14' of trailer 10 may be folded upwards, as shown in FIG. 6C. In some cases, this step may be delayed until hitch mount 104 confirms that hitch 18 of trailer 10 is securely mounted thereto. In some cases, hitch mount 104 may include a user interface to notify a user when hitch 18 is secured to hitch mount 104. For example, hitch mount 104 may illuminate an LED, or display a message via some other user interface to notify the user that hitch 18 was securely fastened to hitch mount 104. Alternatively, hitch mount 104 may be configured to communicate with a controller on board trailer 10. When hitch mount 104 detects that hitch 18 of trailer 10 is securely locked to hitch mount 104, hitch mount 104 notifies the controller of that condition. Upon learning that hitch 18 is secured, the controller of trailer 10 may then allow a user to initiate the folding or collapsing process for trailer 10. Otherwise, the controller may be configured to disable that function to ensure that trailer 10 cannot be folded or collapsed until hitch 18 is secured.

With hitch 18 secured, the user can unlatch bed 12 and chassis 14' of trailer 10, lifting both upwards. As discussed above, this action may be assisted by one or more mechanical, electro-mechanical, pneumatic, or hydraulic mechanisms configured to help the user lift the bed and chassis.

Here, because trailer 10 is now supported by both wheels 16b and 16d as well as the fixed hitch mount 104, trailer 10 is supported by at least three different points that do not lay upon a single line. As a result, trailer 10 can be safely and securely stored in this arrangement. If trailer 10 were to not be mounted to hitch mount 104 when bed 12 and chassis 14' of trailer 10 are folded upwards, trailer 10 would only be supported by wheels 16b and 16d meaning that trailer 10 could be unstable.

As seen in FIG. 6C, by lifting bed 12 and chassis 14' of trailer 10 upwards, the amount of space occupied by trailer 10 is diminished greatly. As shown in FIG. 6D, in some cases, the storing of trailer 10 in the manner shown in FIG. 6C allows for many other objects, such as cars and the like, to be stored alongside trailer 10 in the storage room or location.

In implementations of trailer 10 that include on-board motors or drive mechanisms, when trailer 10 is stowed as shown in FIG. 6D, those systems can be refueled or recharged. Additionally, service of trailer 10 is greatly facilitated as those electrical and/or mechanical mechanisms contained, for example, within box 34 are fully exposed providing easy access thereto.

Figure 7:
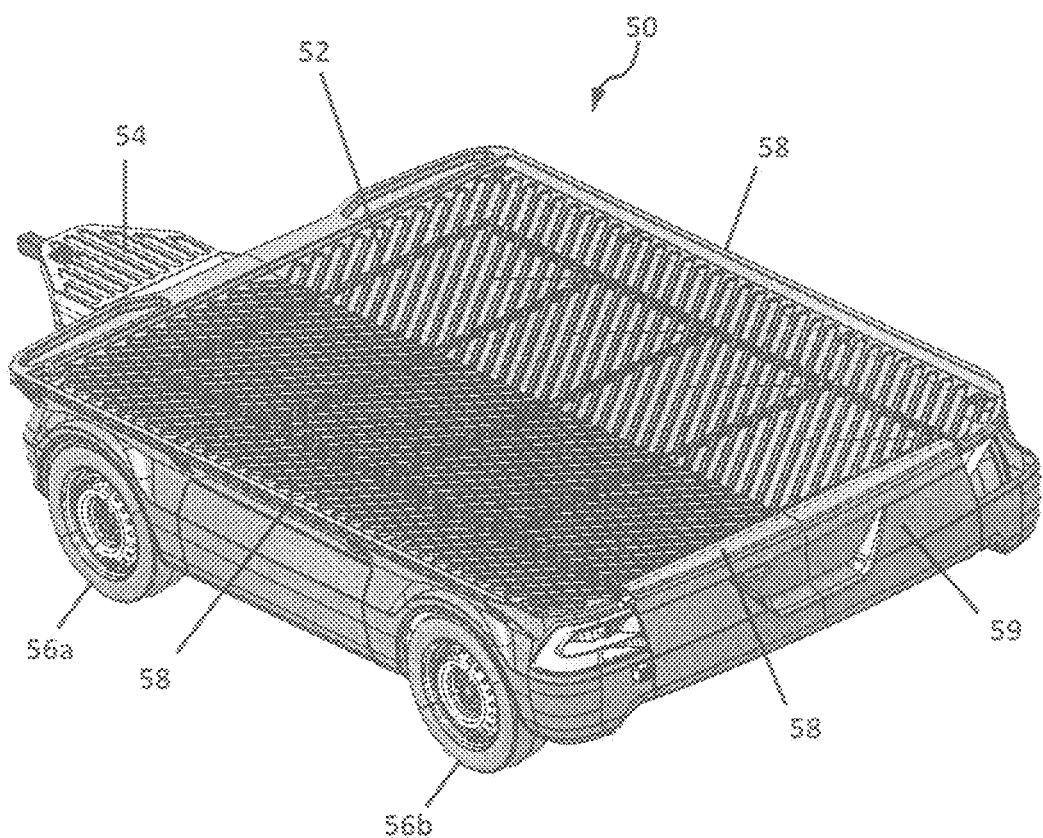
FIG. 7 is a perspective view of an alternative trailer configuration.

FIG. 7 shows an alternate embodiment of the present trailer system. Trailer 50 can be analogous to trailer 10 and specific features of trailer 10 and trailer 50 may be interchangeable in implementing the optimal design and construction of the present trailer system. In the illustrated embodiment, trailer 50 includes a bed mounted over a chassis (not visible). The bed of trailer 50 is fitted with one or more panels 52. Panels 52 may have a honeycomb construction. The honeycomb construction, which is a design that will be familiar to the skilled artisan, allows panels 52 to function as load-bearing panels in the illustrated configuration of trailer 50. Four wheels including wheels 56a and 56d are mounted to the chassis of trailer 50. The chassis of trailer 50 includes hitch structure 54 incorporating a hitch allowing the trailer 50 to be coupled to a tow vehicle for moving the trailer 50 from one location to the next. The trailer further includes a hinged tailgate 59 that can occupy both an upright and locked, or an open configuration to allow for easier loading and unloading of the trailer 50. When in its open position, tailgate 59 is rotated downwards to a horizontal position. When tailgate 59 is open, optional structures within the bed of trailer 50 prevent tailgate 59 from rotating downwards beyond the horizontal position.

Analogous to trailer 10, the bed of trailer 50 may be configured in a number of ways to accommodate various loads. The trailer 50 includes reinforced edges 58 that allow for loading ramps (not shown) to be attached to the sides of the trailer 50. In addition, ramps can be attached to the tailgate 59 in both the raised and lowered configuration. Attaching ramps to the reinforced edges 58 facilitates loading and unloading operations for each of the possible bed configurations. The trailer 50 also has attachment anchors (not shown) that are evenly distributed around the perimeter of the bed. The attachment anchors allow for accessory mounting of, for example, elevated racks, tie down anchors, enclosed caps, and the like.

Figure 8D:
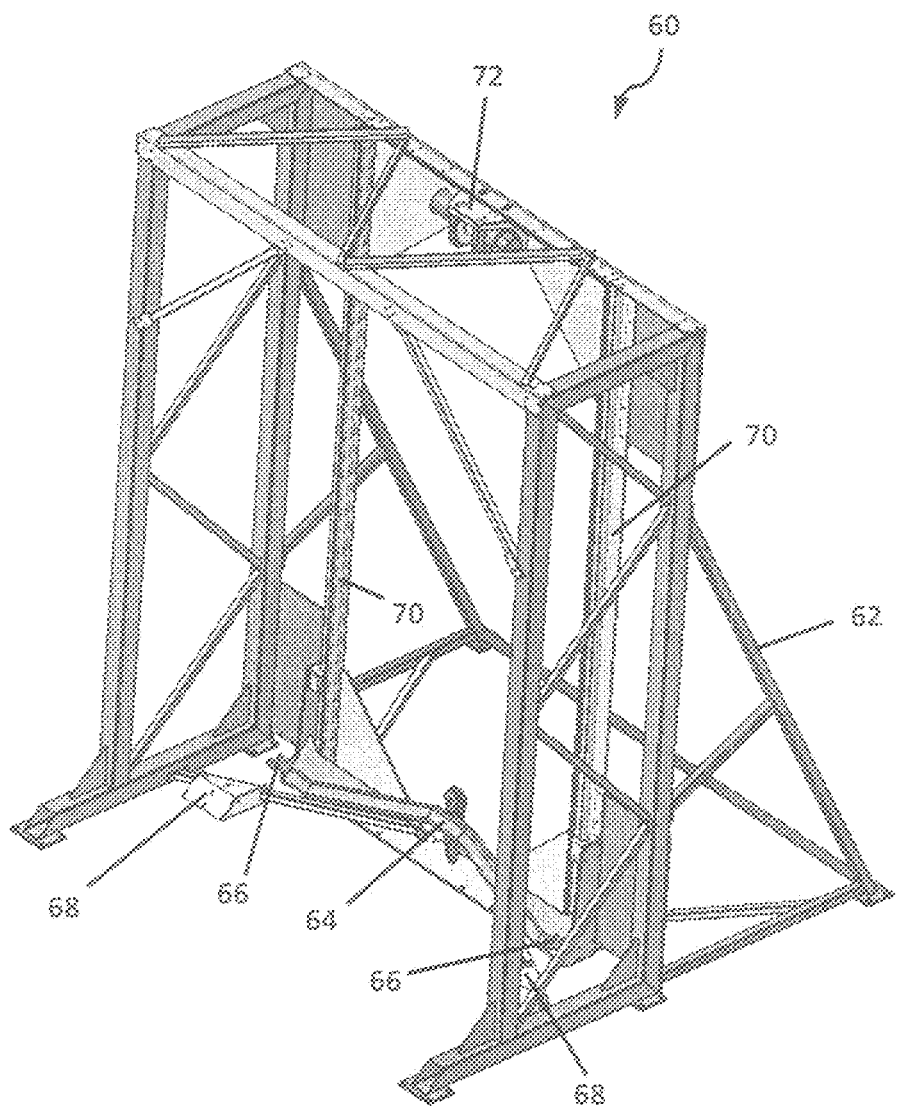

Referring to FIGS. 8A-D, trailer 50 can be stored through the use of a trailer lift system 60. FIG. 8A is an illustration showing an embodiment of a trailer lift system 60 having an optional strut 62. The lift system 60 can be free standing or mounted. For example, if the lift system 60 is to be placed against a rear wall of a garage, the system 60 can be mounted to the wall or other solid structure of the garage, whereas if the system 60 is installed in an outdoor location, optional strut 62 may be used to stabilize the lift system 60. In some applications, strut 62 is fixed to a ground surface.

FIG. 8B shows the trailer 50 is a first, docked position in which the trailer 50 has been guided into the lift system 62. In many configurations of trailer 50, this will be a manual operation, with a user pushing trailer 50 between wheel guides 68 (see FIG. 8d) and towards lift system 60. However, in embodiments of trailer 50 that incorporate power drive units (e.g., electric, gasoline, or other motor configurations to supply power to drive wheels of trailer 50 allowing trailer 50 to move), the user may provide input to trailer 50's drive system (e.g., via a controller, such as a joystick) in order to navigate or drive trailer 50 towards wheel guides 68 and hooks 66 (see FIG. 8d). In one implementation, trailer 50 includes a controller configured to, once trailer 50 is positioned in proximity to wheel guides 68 and hooks 66, autonomously navigate the trailer 50 between wheel guides 68 and to guide the chassis of trailer 50 into lift system 60.

As shown in FIG. 8C, through operation of the lift system 60, a lifting component of the lift system 60 engages the trailer, and the trailer 50 can be raised into a second stowed position in which the trailer is substantially vertical. An understanding of the operation of lift system 60 is provided through the illustration in FIG. 8D. The lift system 60 possesses several features including a lifting beam 64, hooks 66, wheel stops 68, guide rails 70 and winch 72. Trailer 50 is guided into the lift system 60 such that rear wheels 56(b, c) are made to rest against wheel stops 68. In this position, hooks 66 engage a lift system engaging structure of trailer 50 (in one implementation, hooks 66 engage the trailer-mounted swivel lock mechanism 77 shown in FIGS. 9A-C) and the winch 72 can be operated to raise lifting beam 64, which is coupled to hooks 66. Thus, operation of the winch causes the trailer 50 to be raised into the substantially vertical, stowed position.

Alternative lifting mechanisms (as opposed to winch 72) may include any combination of mechanical (e.g., spring-based), electro-mechanical (e.g., motor screw jacks), pneumatic, or hydraulic components to facilitate the lifting and lowering of trailer 50 and are also envisioned. Alternatives to wheel stops 68 are also envisioned. For example, wheel stops 68 can comprise generally upright structures that act as guides to assist the user in correctly positioning the rear wheels of trailer 50 so that the hooks 66 of lift system 60 can accurately engage the lift system engaging portion of trailer 50. Wheel guides 68 can be mounted to or fixed to the lift system 60, or the floor of the storage room or location in which the user anticipates storing trailer 50. Wheel guides 68 may include plastic, metal, or other materials that are sufficiently strong to prevent damage should one of the wheels of trailer 50 roll into one of wheel guides 68. In another implementation, wheel guides 68 may be replaced by wheel chocks, depressions in the ground surface, or other structure or combination of structures configured to constrain a movement of the wheels of trailer 50.

FIGS. 8E-8H illustrate two exemplary ways of stowing trailer 50 through the use of lift system 60. In a first embodiment shown in FIGS. 8E-8F, trailer 50 possesses releasably coupled storage wheels 74. When trailer 50 is raised into the stowed position as in FIG. 8F, optional storage wheels 74 rest on the ground and support the trailer 50. Note that trailer 50 is substantially vertical, but not completely perpendicular to the ground. Storing the trailer 50 at a slight angle allows the trailer to be maneuvered from the stowed position (FIG. 8F) to the deployed position (FIG. 8E) without the need for an additional mechanism to maneuver the front wheels of trailer 50 away from the lift system 60 by simply lowering lifting beam 64.

Figure 8G:
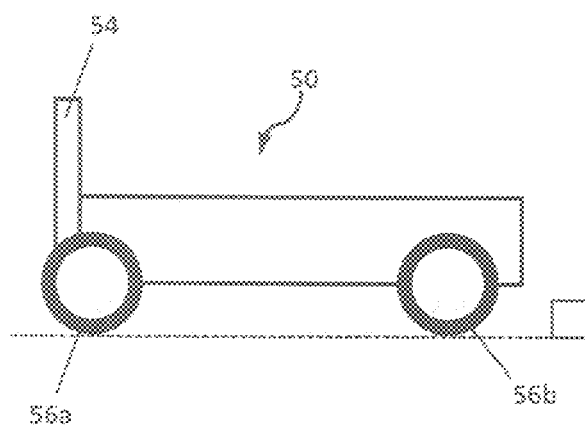
Figure 8H:
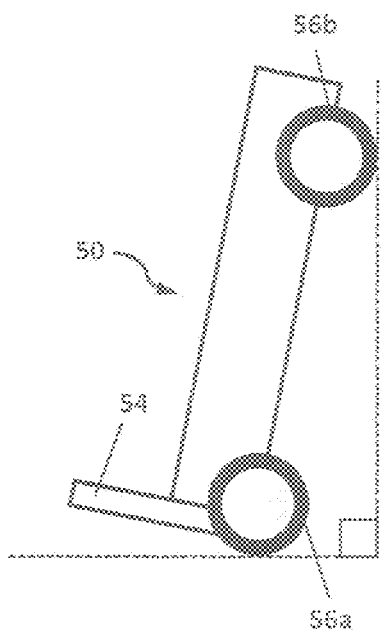

Referring now to FIGS. 8G-H, an alternate embodiment of trailer 50 is illustrated in which front wheels 56a are positioned in a forward position such that at least a portion of the front wheels 56a extends past a front end of the trailer 50. In the embodiment shown in FIGS. 8G-H, storage wheels 74 are not required. Instead, when trailer 50 is raised into the stowed position as in FIG. 8H, front wheels 56a rest on the ground and support the trailer 50. Note again that trailer 50 is substantially vertical, but not completely perpendicular to the ground. Storing the trailer 50 at a slight angle allows the trailer to be maneuvered from the stowed position (FIG. 8H) to the deployed position (FIG. 8G) by simply lowering the trailer 50 and without the need for an additional mechanism to maneuver the front wheels 56a of trailer 50 away from the lift system 60. Note for both embodiments illustrated in FIGS. 8E-H, the trailer hitch 54 can be raised or otherwise stored such that the hitch 54 does not interfere with the stowing operation.

During storage of trailer 50 with lift system 60 it may be desirable to prevent trailer 50 from becoming disengaged from lift system 60. Accordingly, an optional lock mechanism 77 of the trailer 50 and lift system 60 is illustrated in FIGS. 9A-C that may be utilized to prevent trailer 50 from becoming disengaged from lift system 60. FIG. 9A is a detailed view of the swivel lock mechanism 77. FIGS. 9B and 9C are cross-sectional views taken along plane 9B-9B of FIG. 9A showing the swivel lock mechanism 77 in an unlocked and locked position, respectively.

Swivel lock mechanism 77 can be connected to trailer 50 and is configured to be the portion of trailer 50 that engages lift system 60 when trailer 50 is stowed. Swivel lock mechanism 77 includes a cylinder 75 and a restrictor plate 78. In one embodiment, the swivel lock mechanism 77 includes two parallel plates spaced apart. Cylinder 75 is positioned in the space between the plates with an axis of cylinder 75 on a line orthogonal to the parallel plates. Restrictor plate 78 is also disposed between the parallel plates and is spaced apart from cylinder 75 to define an open region that a portion of hook 66 can pass therethrough.

The swivel lock mechanism 77 can be attached to trailer 50 at any suitable location. In one implementation, the swivel lock mechanism 77 is attached to the chassis of trailer 50 at a rear end of trailer 50. Furthermore, swivel lock mechanism 77 is configured to extend from trailer 50 or be otherwise accessible in order to interface with hooks 66 when trailer 50 is guided into lift system 60. Generally, the trailer 50 will include two swivel lock mechanisms 77 mounted to the rear of the trailer 50 and positioned to engage with each of hooks 66 of the lift system 60. In order to place the trailer 50 in its stowed position, each of the hooks 66 of the lift system 60 engage the swivel lock mechanisms 77 of the trailer 50. Once coupled to the swivel lock mechanisms 77, the lift system can be activated to raise the hooks 66 and, thereby, the trailer 50.

When the lifting beam 64 of the lift system 60 is in the lowered position, as in FIG. 8B or 8D, hooks 66 are configured to be positioned directly below cylinder 75 of locking mechanism 77. In this configuration, restrictor plate 78 of swivel lock mechanism 77 is positioned to allow trailer 50 to maneuver freely into and out of lift system 60. This configuration is shown in FIGS. 9A-B in which restrictor plate 78 would not prevent hooks 66 from being disengaged from trailer 50. FIG. 9B is a cross-sectional view taken along the line 9B-9B showing the swivel lock mechanism 77 and hook 66 of FIG. 9A. An imaginary line, as indicated by the dashed line in FIGS. 9B-C, passes through both the restrictor plate 78 and the axis of the cylinder 75. Swivel lock mechanism 77 is designed such that when a portion of hook 66 breaks the imaginary line, the combination of restrictor plate 78 and cylinder 75 engages hook 66. As shown in FIG. 9B, no portion of hook 66 passes through the line running between restrictor plate 78 and cylinder 75. As such, hook 66 can be disengaged from cylinder 75.

FIG. 9C is a cross-section view of the swivel lock mechanism 77, showing the mechanism after the trailer 50 has been lifted by the lift system 60. When lifting beam 64 is raised via operation of winch 72, trailer 50, and, therefore, the swivel lock mechanism 77 is rotated about hook 66 and oriented in a substantially vertical, stowed position. Restrictor plate 78 is rotated by virtue of the rotation of the swivel lock mechanism 77 such that trailer 50 is coupled with hooks 66. As shown in FIG. 9C, in the raised position, hook 66 has passed through the line running between restrictor plate 78 and cylinder 75. Accordingly, when lifting beam 64 is raised, restrictor plate 78 is positioned, by virtue of the rotation of trailer 50, so that trailer 50 can no longer be disengaged from hook 66. Trailer 50 is effectively locked into and prevented from disengaging from the lift system 60. Specifically, restrictor plate 78 precludes vertical displacement of trailer 50 such that the swivel lock mechanism 77 is prevented from decoupling from hooks 66.

Figure 9D:
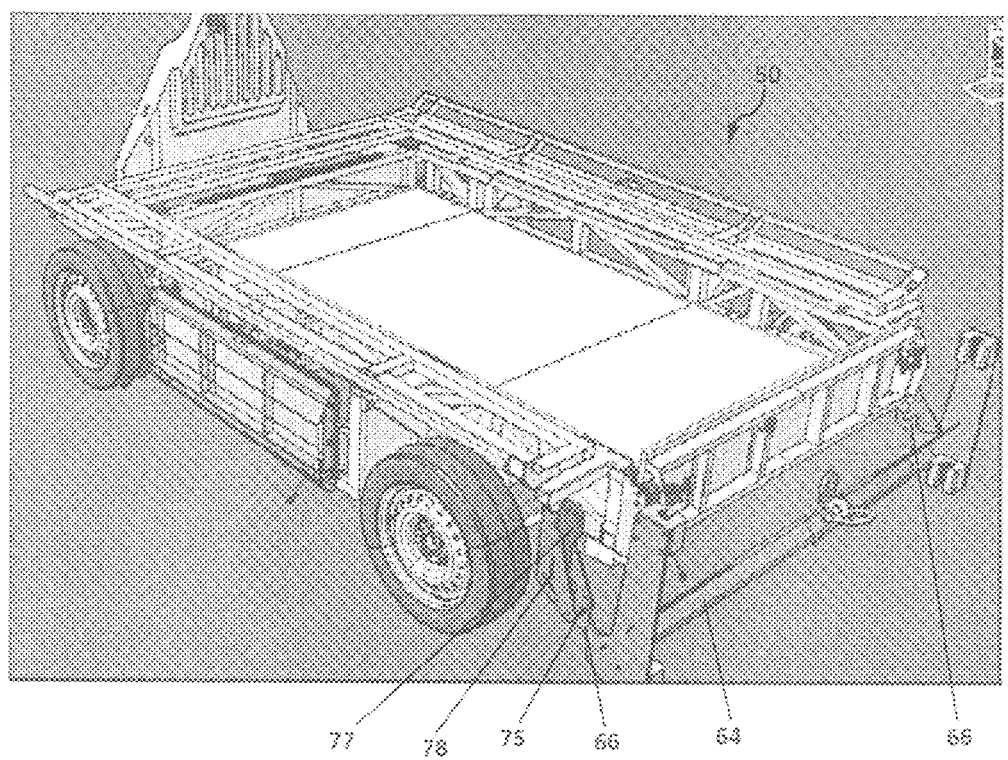
FIG. 9D is a view of the swivel lock mechanism attached to the trailer.

FIG. 9D is a perspective view of a trailer 50 incorporating an example implementation of swivel lock mechanism 77. FIG. 9D also depicts lifting beam 64 of a lift system (though the other components of the lift system are not depicted). As such, FIG. 9D depicts trailer 50 positioned so as to be raised by the lift system into a stowed position. As illustrated, swivel lock mechanism 77 is connected to the chassis of trailer 50. Swivel lock mechanism 77 is attached to a rear portion of trailer 50 and is positioned such that hooks 66 of the lifting beam 64 can engage cylinder 75 of the swivel lock mechanism 77 so as to raise the trailer into a stowed position, as described herein.

Figure 10A:
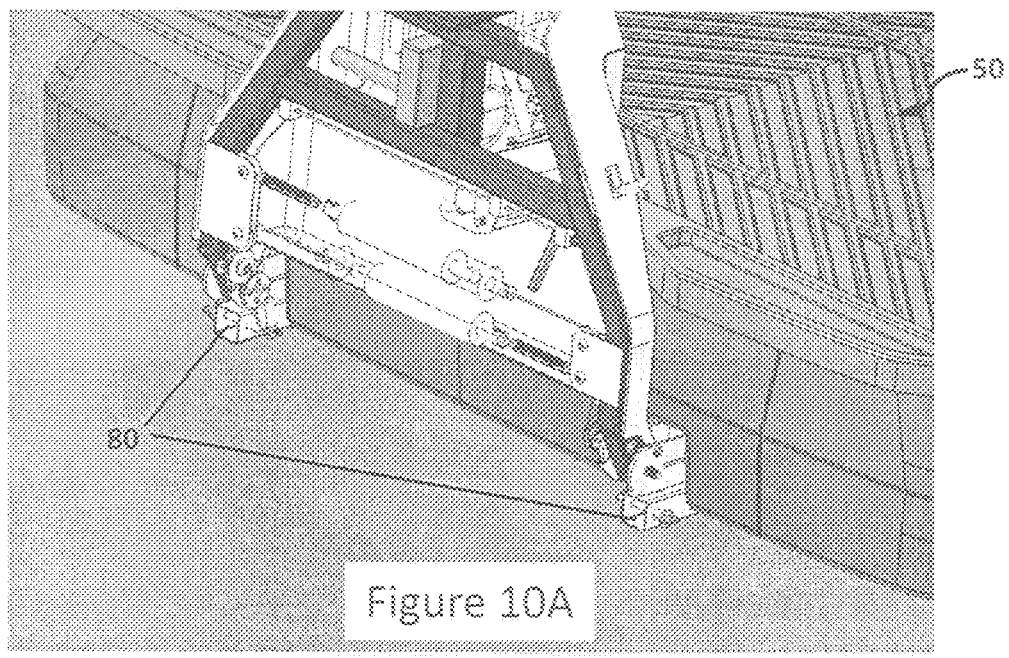
FIGS. 10A-10B are detail views showing the storage wheels of the trailer.
Figure 10B:
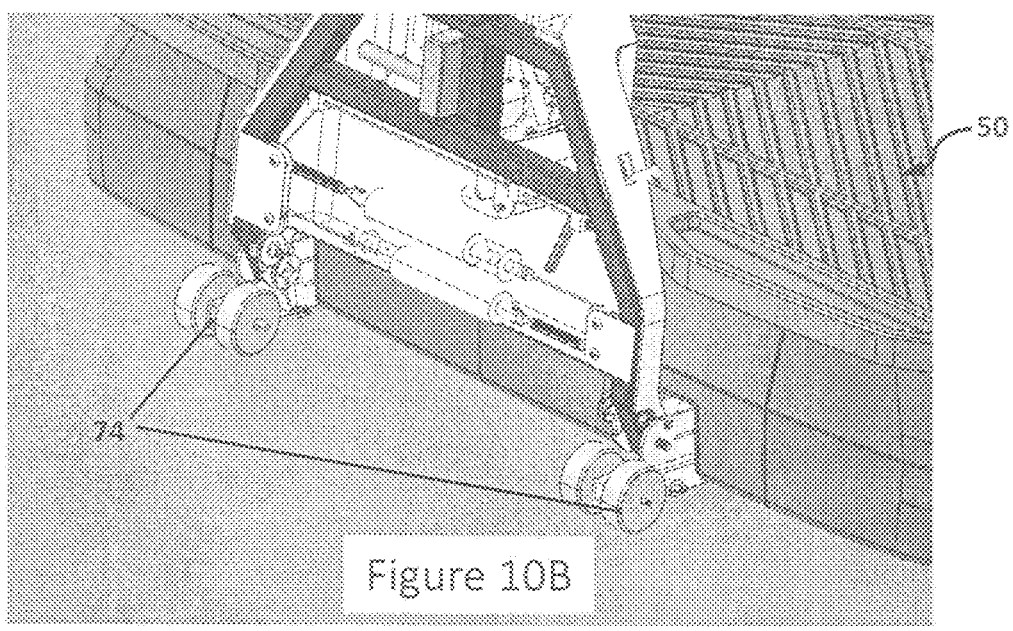

An embodiment of the implementation of storage wheels 74 is shown in FIGS. 10A-B. Storage wheel slots 80 are positioned at the front end of trailer 50 as in FIG. 10A. Storage wheel slots 80 are configured to receive storage wheels 74 such that storage wheels 74 may be releasably coupled to trailer 50 and further that the wheels 74 are made to rest on the ground during the stowing operation as in FIG. 8F. Storage wheels 74 are shown in the coupled position in FIG. 10B. Coupling of storage wheels 74 to trailer 50 is accomplished with an optional locking mechanism such as a linchpin or other suitable coupling means.

In one example use case for trailer 50, a user may choose to stow trailer 50 in the following manner. Beginning with trailer 50 in a deployed position, the user first guides trailer 50 into lift system 60 by any one of the previously described methods. For example, if trailer 50 is hitched to a vehicle, the user may first back up the vehicle and trailer 50 to position trailer 50 near the lift system. Next, the user can unhitch trailer 50 from the vehicle and manually guide trailer 50 the rest of the way into lift system 60 such that rear wheels 56(b,c) of trailer 50 abut wheel stops 68. With trailer 50 docked in lift system 60, swivel lock mechanism 77 is positioned such that cylinders 75 can couple with hooks 66. At this point, the user can attach storage wheels 74 to trailer 50. Lift system 60 is then operated to raise the lifting beam 64 such that the rear end of trailer 50 is lifted away from the ground surface on which trailer 50 rests. By operating the lift system 60, the trailer transitions from the deployed position to the substantially vertical stowed position. During the transition, storage wheels come into contact with the ground surface such that the trailer rests on the storage wheels. In addition, as described previously, one or more swivel lock mechanisms 77 rotate in concert with trailer 50 such that restrictor plates 78 and cylinders 75 engage hooks 66. Trailer 50 can remain in the stowed position for a period of time until the user desires to deploy trailer 50. In deploying trailer 50, the user can perform the same actions used to stow trailer 50 by carrying out the actions in the reverse order.

In one implementation, a trailer includes first and second axles, each of the first and second axles being configured to couple to at least two wheels, a chassis connected to the first and second axles, a hitch connected to the chassis, and a lift system engaging structure connected to the chassis of the trailer. The lift system engaging structure is configured to releasably engage a lifting component of a lift system. The lift system is configured to raise the lifting component to position the trailer in a stowed position.

In another implementation, a trailer includes a chassis connected to first and second axles, and a lift system engaging structure connected to the chassis of the trailer. The lift system engaging structure is configured to engage a lift system.

In another implementation, a lift system includes a frame, a lifting mechanism connected to the frame, and a lifting component connected to the lifting mechanism. The lifting component is configured to releasably couple to a lift system engaging structure of a trailer, wherein the lift system is configured to maneuver the trailer into a stowed position.

Although the present invention has been described with respect to preferred embodiment(s), any person skilled in the art will recognize that changes may be made in form and detail, and equivalents may be substituted for elements of the invention without departing from the spirit and scope of the invention. Therefore, it is intended that the invention not be limited to the particular embodiments disclosed for carrying out this invention, but will include all embodiments falling within the scope of the appended claims.

What is claimed is:

1. A trailer, comprising:
   first and second axles, each of the first and second axles being configured to couple to at least two wheels;
   a chassis connected to the first and second axles, the chassis including at least two storage wheels, wherein the at least two storage wheels are releasably coupled to the chassis;
   a hitch connected to the chassis; and
   a lift system engaging structure connected to the chassis of the trailer;
   wherein the lift system engaging structure is configured to releasably couple to a lifting component of a lift system, the lift system being configured to raise the lifting component to position the trailer in a stowed position.

2. The trailer of claim 1, wherein the lift system engaging structure comprises a swivel lock mechanism.

3. The trailer of claim 2, wherein the swivel lock mechanism comprises:
   a first plate and a second plate, the first plate being parallel to the second plate;
   a cylinder connected to the first plate and the second plate; and
   a restrictor plate connected to the first plate and the second plate, the restrictor plate being separated from the cylinder by a distance.

4. The trailer of claim 3, wherein the lifting component of the lift system is configured to releasably couple to the cylinder.

5. The trailer of claim 4, wherein, when the lift system engaging structure is coupled to the lifting component of the lift system and the trailer is in the stowed position, the restrictor plate inhibits removal of the lift system engaging structure from the lifting component of the lift system.

6. The trailer of claim 1, including a bed connected to the chassis, wherein the bed includes a lower deck and an upper deck, the upper deck including a plurality of removable panels.

7. The trailer of claim 6, wherein at least one of the plurality of removable panels comprises a load bearing panel having a honeycomb construction.

8. The trailer of claim 1, wherein the storage wheels are configured to be coupled to the chassis with a linchpin.

9. A trailer, comprising:
   a chassis connected to first and second axles; and
   a lift system engaging structure connected to the chassis of the trailer, the lift system engaging structure being configured to releasably couple to a lift system, the lift system engaging structure including:
   a swivel lock mechanism, including:
      a first plate and a second plate, the first plate being parallel to the second plate;
      a cylinder connected to the first plate and the second plate; and
      a restrictor plate connected to the first plate and the second plate, the restrictor plate being separated from the cylinder by a distance.

10. The trailer of claim 9, wherein the lift system is configured to releasably couple to the cylinder.

11. The trailer of claim 10, wherein, when the lift system engaging structure is coupled to the lift system and the trailer is in a stowed position, the restrictor plate inhibits removal of the lift system engaging structure from the lift system.

12. A lift system, comprising;
   a frame;
   a lifting mechanism connected to the frame; and
   a lifting component connected to the lifting mechanism, the lifting component being configured to releasably couple to a lift system engaging structure of a trailer, the lift system engaging structure including a swivel lock mechanism, the swivel lock mechanism including a first plate and a second plate, the first plate being parallel to the second plate, a cylinder connected to the first plate and the second plate, and a restrictor plate connected to the first plate and the second plate, the restrictor plate being separated from the cylinder by a distance;
   wherein the lift system is configured to maneuver the trailer into a stowed position.

13. The lift system of claim 12, wherein the lifting component of the lift system to configured to releasably couple to the cylinder.

14. The lift system of claim 12, wherein the lifting component comprises a lifting beam and hooks.

15. The lift system of claim 14, wherein the lifting component is slidably coupled to the frame.

* * * * *